United States Patent
Fan et al.

(10) Patent No.: US 11,290,861 B2
(45) Date of Patent: Mar. 29, 2022

(54) MODULATION AND CODING SCHEME (MCS) CORRECTION WHEN SHARING RADIO RESOURCES BETWEEN MTC AND NON-MTC

(71) Applicant: Nokia Solutions and Networks Oy, Espoo (FI)

(72) Inventors: Dongsheng Fan, Shanghai (CN); Yigang Cai, Naperville, IL (US)

(73) Assignee: Nokia Sollutions and Networks Oy, Espoo (FI)

( * ) Notice: Subject to any disclaimer, the term of this patent is extended or adjusted under 35 U.S.C. 154(b) by 0 days.

(21) Appl. No.: 16/647,969

(22) PCT Filed: Sep. 19, 2017

(86) PCT No.: PCT/CN2017/102234
§ 371 (c)(1),
(2) Date: Mar. 17, 2020

(87) PCT Pub. No.: WO2019/056169
PCT Pub. Date: Mar. 28, 2019

(65) Prior Publication Data
US 2020/0221273 A1 Jul. 9, 2020

(51) Int. Cl.
*H04W 4/70* (2018.01)
*H04B 17/336* (2015.01)
(Continued)

(52) U.S. Cl.
CPC .......... *H04W 4/70* (2018.02); *H04B 17/336* (2015.01); *H04L 1/0003* (2013.01); *H04W 72/1263* (2013.01); *H04W 92/10* (2013.01)

(58) Field of Classification Search
None
See application file for complete search history.

(56) References Cited

U.S. PATENT DOCUMENTS

2013/0201830 A1* 8/2013 Wang .................... H04W 40/24
370/235
2015/0319765 A1 11/2015 Zhu et al.
(Continued)

FOREIGN PATENT DOCUMENTS

CN 102076028 A 5/2011
CN 106685587 A 5/2017
(Continued)

OTHER PUBLICATIONS

International Search Report for PCT/CN2017/102234 dated Jun. 1, 2018.
(Continued)

*Primary Examiner* — Anh Vu H Ly
(74) *Attorney, Agent, or Firm* — Fay Sharpe LLP

(57) ABSTRACT

Systems, methods, and software for sharing resources of an air interface. In one embodiment, an access network element communicates with a plurality of devices over an air interface. The access network element identifies a resource sharing window having an MTC-On interval where MTC is allowed, and having an MTC-Off interval where MTC is prohibited. Between a threshold time and an end of the MTC-Off interval, the access network element selects an adjusted Modulation and Coding Scheme (MCS) for a legacy device of the plurality of devices that is lower than a standard MCS for the legacy device selected based on channel quality information for the legacy device, allocates a set of the MTC radio resources to the legacy device, and schedules a non-MTC transmission for the legacy device on the set of the MTC radio resources based on the adjusted MCS.

22 Claims, 16 Drawing Sheets

(51) Int. Cl.
*H04L 1/00* (2006.01)
*H04W 72/12* (2009.01)
*H04W 92/10* (2009.01)

(56) References Cited

U.S. PATENT DOCUMENTS

| | | | |
|---|---|---|---|
| 2016/0242229 A1 | 8/2016 | Balachandran et al. | |
| 2017/0111152 A1* | 4/2017 | Blankenship | H04L 5/0051 |
| 2017/0347351 A1* | 11/2017 | Cai | H04W 4/70 |
| 2018/0183938 A1* | 6/2018 | Cai | H04W 72/042 |
| 2020/0077245 A1* | 3/2020 | Cai | H04W 74/0833 |
| 2020/0205169 A1* | 6/2020 | Cai | H04L 5/0037 |

FOREIGN PATENT DOCUMENTS

| | | |
|---|---|---|
| WO | WO 2011/097767 A1 | 8/2011 |
| WO | WO 2014/069946 A1 | 5/2014 |
| WO | WO 2018/203898 A1 | 11/2018 |
| WO | WO 2018/203899 A1 | 11/2018 |

OTHER PUBLICATIONS

Huawei et al, Supporting FDM for MTC UEs and other UEs 3GPP Draft: R1-150400, 3$^{rd}$ Generation Partnership Progject (3GPP), Mobile Competence Centre; vol. RAN WG1 Feb. 8, 2015 XP050933609.

3rd Generation Partnership Project; Technical Specification Group Radio Access Network; Evolved Universal Terrestrial Radio Access (E-UTRA); Physical channels and modulation (Release 13)3GPP TS 36.211 V13.13.0 (Dec. 2019)—173 pp.

3rd Generation Partnership Project; Technical Specification Group Radio Access Network; Evolved Universal Terrestrial Radio Access (E-UTRA); Multiplexing and channel coding (Release 13) 3GPP TS 36.212 V13.10.0 (Dec. 2019)—141 pp.

ETSI TS 136213 V14.3.0 (Aug. 2017) Technical Specification LTE; Evolved Universal Terrestrial Radio Access (E-UTRA); Physical layer procedures 3GPP TS 36 213 V14.3.0 Release 14-462 pages https://www.etsi.orq/deliver/etsi ts/13620 . . . 9/136213/14.03.00_60/ts_136213v140300p.pdf.

* cited by examiner

FIG. 6

5 MHz BANDWIDTH

| | SUB-FRAME 0 | SUB-FRAME 1 | | |
|---|---|---|---|---|
| PRB24 | | | | |
| PRB23 | | | | |
| PRB22 | | | | |
| PRB21 | | | | |
| PRB20 | | | | |
| PRB19 | | | | |
| PRB18 | | | | |
| PRB17 | | | | |
| PRB16 | | | | |
| PRB15 | | | | |
| PRB14 | | | | |
| PRB13 | | | | |
| PRB12 | | | | |
| PRB11 | | | | |
| PRB10 | | | | |
| PRB9 | | | | |
| PRB8 | | | | |
| PRB7 | | | | |
| PRB6 | | | | |
| PRB5 | | | | |
| PRB4 | | | | |
| PRB3 | | | | |
| PRB2 | | | | |
| PRB1 | | | | |
| PRB0 | | | | |

408 { PRB22–PRB24 }

602 — NARROWBAND3 (PRB19–PRB24)
602 — NARROWBAND2 (PRB13–PRB18)
602 — NARROWBAND1 (PRB7–PRB12)
602 — NARROWBAND0 (PRB0–PRB5)

| | FRAME0 | | | | | | | | | | FRAME1 | | | | | | | | | | FRAME2 | | | | | | | | | | FRAME3 | | | | | | | | | |
|---|---|---|---|---|---|---|---|---|---|---|---|---|---|---|---|---|---|---|---|---|---|---|---|---|---|---|---|---|---|---|---|---|---|---|---|---|---|---|---|---|
| | 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 |
| MPDCCH | | U | U | | D | D | D | | D | | | D | D | D | D | D | D | | D | | | | | D | D | D | D | | D | | | | | | D | D | D | | D | |
| PDSCH | | | | | | | | | | | D | D | D | D | D | | | | | | D | D | D | D | D | | | | | | D | D | D | D | D | | | | | |
| PUSCH | | | | | | | | U | U | U | U | U | U | U | U | U | | | | | U | U | U | U | U | U | U | | | | U | U | U | U | U | | | | | |

| | FRAME0 | | | | | | | | | | FRAME1 | | | | | | | | | | FRAME2 | | | | | | | | | | FRAME3 | | | | | | | | | |
|---|---|---|---|---|---|---|---|---|---|---|---|---|---|---|---|---|---|---|---|---|---|---|---|---|---|---|---|---|---|---|---|---|---|---|---|---|---|---|---|---|
| | 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 |
| MPDCCH | | U | U | U | | | | | | | | | | | | | | | | | | U | U | U | | | | | | | | | | | | | | | | |
| PDSCH | | | | | | | | | | | | | | | | | | | | | | | | | | | | | | | | | | | | | | | | |
| PUSCH | | | | | | | | U | U | U | U | U | U | U | U | U | | | | | | | | | | | | U | U | U | U | U | U | U | U | U | | | | |

| | FRAME0 | | | | | | | | | | FRAME1 | | | | | | | | | | FRAME2 | | | | | | | | | | FRAME3 | | | | | | | | | |
|---|---|---|---|---|---|---|---|---|---|---|---|---|---|---|---|---|---|---|---|---|---|---|---|---|---|---|---|---|---|---|---|---|---|---|---|---|---|---|---|---|
| | 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 |
| MPDCCH | | | | | D | D | D | | D | | | D | D | D | D | D | | | | | | | | | D | D | D | | D | | | D | D | D | D | D | D | | D | |
| PDSCH | | | | | | | | | | | | | | | | | | | | | | | | | | | | | | | | | | | | | | | | |
| PUSCH | | | | | | | | | | | | | | | | | | | | | | | | | | | | | | | | | | | | | | | | |

MODULATION AND CODING SCHEME (MCS) CORRECTION WHEN SHARING RADIO RESOURCES BETWEEN MTC AND NON-MTC

FIELD OF THE INVENTION

The invention is related to the field of communication systems and, in particular, to sharing of radio resources between Machine Type Communications (MTC) and non-MTC.

BACKGROUND

Machine Type Communications (MTC) or Machine-to-Machine (M2M) communications refer to technologies that allow devices to communicate with no or little human intervention. MTC devices store data, and transmit the data to other MTC devices or an MTC server over a network, such as a cellular network. For example, an MTC device may be attached to a gas or electric meter, and the MTC device periodically (e.g., weekly, monthly, etc.) transmits a meter reading to an MTC server, such as at the utility company.

The amount of data exchanged between MTC devices is typically very small, such as less than a few bytes. Because MTC devices send or receive only small amounts of data, the exchanges of data are considered "small data transmissions". The amount that is considered "small" may depend on individual network operators.

MTC continues to increase over core networks. Thus, efficient use of network resources for MTC, especially radio resources, is important to network operators.

SUMMARY

Embodiments described herein provide enhanced sharing of radio resources on the air interface between MTC transmissions and non-MTC transmissions. A resource sharing window is defined for scheduling radio resources between MTC and non-MTC. A resource sharing window includes an MTC-On interval where MTC transmissions are allowed, and an MTC-Off interval where MTC transmissions are prohibited. Toward the end of an MTC-Off interval, the Modulation and Coding Scheme (MCS) for a non-MTC device may be lowered to increase the likelihood that a transmission involving the non-MTC device is successfully received and decoded by the destination (i.e., the device for a downlink transmission and a base station for an uplink transmission). The MCS is typically selected for a device based on channel quality identified for the device, and an adjusted MCS as described herein is lower than the MCS which would be selected based on channel quality. One technical benefit of using an adjusted MCS toward the end of an MTC-Off interval is that a Hybrid Automatic Repeat Request (HARQ) process for the transmission will more likely complete before the end of the MTC-Off interval, instead of being suspended during the next MTC-On interval, to more efficiently utilize network resources.

One embodiment comprises an access network element of an access network. The access network element includes a radio interface component configured to communicate with a plurality of devices over an air interface, and a pattern database configured to store a sharing pattern that maps radio resources on a physical layer of the air interface between MTC radio resources and non-MTC radio resources. The access network element further includes a scheduling mechanism configured to identify a resource sharing window having an MTC-On interval where MTC is allowed, and having an MTC-Off interval where MTC is prohibited. Between a threshold time and an end of the MTC-Off interval, the scheduling mechanism is configured to select an adjusted MCS for a legacy device of the plurality of devices that is lower than a standard MCS for the legacy device selected based on channel quality information for the legacy device, to allocate a set of the MTC radio resources to the legacy device based on the sharing pattern, and to schedule a non-MTC transmission for the legacy device on the set of the MTC radio resources based on the adjusted MCS.

In another embodiment, the scheduling mechanism is configured to select among multiple adjusted MCSs for the legacy device that are lower than the standard MCS, where the adjusted MCSs decrease from the threshold time to the end of the MTC-Off interval.

In another embodiment, a time period from the threshold time to the end of the MTC-Off interval comprises an adjustment period, the adjustment period comprises a plurality of sub-periods in sequence that each specify a signal-to-interference-plus-noise ratio (SINR) reduction value, and SINR reduction values increase from a first one of the sub-periods in the sequence to a last one of the sub-periods in the sequence.

In another embodiment, the scheduling mechanism is configured to identify the SINR reduction value for a sub-period of the plurality of sub-periods, to determine an estimated SINR for the legacy device based on the channel quality information, to subtract the SINR reduction value for the sub-period from the estimated SINR to determine an adjusted SINR for the legacy device, and to select the adjusted MCS for the legacy device based on the adjusted SINR.

In another embodiment, the scheduling mechanism is configured to determine whether the SINR reduction value for the sub-period equals a threshold value, and to determine that the MTC radio resources are not available to the legacy device when the SINR reduction value equals the threshold value.

In another embodiment, the scheduling mechanism is configured to schedule the non-MTC transmission for the legacy device on the set of the MTC radio resources of an uplink channel.

In another embodiment, the scheduling mechanism is configured to schedule the non-MTC transmission for the legacy device on the set of the MTC radio resources of a downlink channel.

In another embodiment, before selecting the adjusted MCS for the legacy device, the scheduling mechanism is configured to mark the MTC radio resources as unavailable, to allocate a set of the non-MTC radio resources to the legacy device, to select the standard MCS for the legacy device, and to determine a transport block size for the legacy device based on the standard MCS. After selecting the adjusted MCS for the legacy device, the scheduling mechanism is configured to determine an adjusted transport block size for the legacy device according to the adjusted MCS, and to determine whether the adjusted transport block size is increased over the transport block size determined according to the standard MCS. When the adjusted transport block size is not increased, the scheduling mechanism is configured to allocate the set of the MTC radio resources to the legacy device that were previously marked as unavailable until the adjusted transport block size is increased.

In another embodiment, the scheduling mechanism is configured to request a legacy load and an MTC load in the access network, to determine whether the legacy load exceeds a first high threshold, and to set a duration of the MTC-On interval for a next resource sharing window to a minimum when the legacy load exceeds the first high threshold. When the legacy load does not exceed the first high threshold, the scheduling mechanism is configured to determine whether the legacy load is less than a first low threshold, and to set the duration of the MTC-On interval for the next resource sharing window to a maximum when the legacy load is less than the first low threshold. When the legacy load is not less than the first low threshold, the scheduling mechanism is configured to determine whether the MTC load exceeds a second high threshold, and to increase the duration of the MTC-On interval for the next resource sharing window when the MTC load exceeds the second high threshold. When the MTC load does not exceed the second high threshold, the scheduling mechanism is configured to determine whether the MTC load is less than a second low threshold, and to decrease the duration of the MTC-On interval for the next resource sharing window when the MTC load is less than the second low threshold. When the MTC load is not less than the second low threshold, the scheduling mechanism is configured to maintain the duration of the MTC-On interval in the next resource sharing window.

Another embodiment comprises a method of sharing an air interface between an access network element of an access network and a plurality of devices. The method comprises storing a sharing pattern that maps radio resources on a physical layer of the air interface between MTC radio resources and non-MTC radio resources, and identifying a resource sharing window having an MTC-On interval where MTC is allowed, and having an MTC-Off interval where MTC is prohibited. Between a threshold time and an end of the MTC-Off interval, the method comprises selecting an adjusted MCS for a legacy device of the plurality of devices that is lower than a standard MCS for the legacy device selected based on channel quality information for the legacy device, allocating a set of the MTC radio resources to the legacy device based on the sharing pattern, and scheduling a non-MTC transmission for the legacy device on the set of the MTC radio resources based on the adjusted MCS.

In another embodiment, selecting the adjusted MCS for the legacy device comprises selecting among multiple adjusted MCSs for the legacy device that are lower than the standard MCS. The adjusted MCSs decrease from the threshold time to the end of the MTC-Off interval.

In another embodiment, a time period from the threshold time to the end of the MTC-Off interval comprises an adjustment period, the adjustment period comprises a plurality of sub-periods in sequence that each specify a SINR reduction value, and SINR reduction values increase from a first one of the sub-periods in the sequence to a last one of the sub-periods in the sequence.

In another embodiment, selecting the adjusted MCS comprises identifying the SINR reduction value for a sub-period of the plurality of sub-periods, determining an estimated SINR for the legacy device based on the channel quality information, subtracting the SINR reduction value for the sub-period from the estimated SINR to determine an adjusted SINR for the legacy device, and selecting the adjusted MCS for the legacy device based on the adjusted SINR.

In another embodiment, the method further comprises determining whether the SINR reduction value for the sub-period equals a threshold value, and determining that the MTC radio resources are not available to the legacy device when the SINR reduction value equals the threshold value.

In another embodiment, scheduling the non-MTC transmission for the legacy device comprises scheduling the non-MTC transmission for the legacy device on the set of the MTC radio resources of an uplink channel.

In another embodiment, scheduling the non-MTC transmission for the legacy device comprises scheduling the non-MTC transmission for the legacy device on the set of the MTC radio resources of a downlink channel.

In another embodiment, before selecting the adjusted MCS for the legacy device, the method comprises marking the MTC radio resources as unavailable, allocating a set of the non-MTC radio resources to the legacy device, selecting the standard MCS for the legacy device, and determining a transport block size for the legacy device based on the standard MCS. After selecting the adjusted MCS for the legacy device, the method comprises determining an adjusted transport block size for the legacy device according to the adjusted MCS, determining whether the adjusted transport block size is increased over the transport block size determined according to the standard MCS, and when the adjusted transport block size is not increased, allocating the set of the MTC radio resources to the legacy device that were previously marked as unavailable until the adjusted transport block size is increased.

In another embodiment, the method further comprises requesting a legacy load and an MTC load in the access network, determining whether the legacy load exceeds a first high threshold, and setting a duration of the MTC-On interval for a next resource sharing window to a minimum when the legacy load exceeds the first high threshold. When the legacy load does not exceed the first high threshold, the method further comprises determining whether the legacy load is less than a first low threshold, and setting the duration of the MTC-On interval for the next resource sharing window to a maximum when the legacy load is less than the first low threshold. When the legacy load is not less than the first low threshold, the method further comprises determining whether the MTC load exceeds a second high threshold, and increasing the duration of the MTC-On interval for the next resource sharing window when the MTC load exceeds the second high threshold. When the MTC load does not exceed the second high threshold, the method further comprises determining whether the MTC load is less than a second low threshold, and decreasing the duration of the MTC-On interval for the next resource sharing window when the MTC load is less than the second low threshold. When the MTC load is not less than the second low threshold, the method further comprises maintaining the duration of the MTC-On interval in the next resource sharing window.

Another embodiment comprises a non-transitory computer readable medium embodying programmed instructions executed by a processor, wherein the instructions direct the processor to implement an access network element of an access network configured to communicate with a plurality of devices over an air interface. The access network element is configured to store a sharing pattern that maps radio resources on a physical layer of the air interface between MTC radio resources and non-MTC radio resources. The access network element is configured to identify a resource sharing window having an MTC-On interval where MTC is allowed, and having an MTC-Off interval where MTC is prohibited. Between a threshold time and an end of the MTC-Off interval, the access network element is configured to select an adjusted MCS for a legacy device of the plurality of devices that is lower than a standard MCS for the legacy device selected based on channel quality information for the legacy device, to allocate a set of the MTC radio resources to the legacy device based on the sharing pattern, and to schedule a non-MTC transmission for the legacy device on the set of the MTC radio resources based on the adjusted MCS.

Another embodiment comprises an access network element of an access network. The access network element includes a means for communicating with a plurality of devices over an air interface, and a means for storing a sharing pattern that maps radio resources on a physical layer of the air interface between MTC radio resources and non-MTC radio resources. The access network element includes a means for identifying a resource sharing window having an MTC-On interval where MTC is allowed, and having an MTC-Off interval where MTC is prohibited. Between a threshold time and an end of the MTC-Off interval, the access network element includes a means for selecting an adjusted MCS for a legacy device of the plurality of devices that is lower than a standard MCS for the legacy device selected based on channel quality information for the legacy device, allocating a set of the MTC radio resources to the legacy device based on the sharing pattern, and scheduling a non-MTC transmission for the legacy device on the set of the MTC radio resources based on the adjusted MCS.

The above summary provides a basic understanding of some aspects of the specification. This summary is not an extensive overview of the specification. It is intended to neither identify key or critical elements of the specification nor delineate any scope of the particular embodiments of the specification, or any scope of the claims. Its sole purpose is to present some concepts of the specification in a simplified form as a prelude to the more detailed description that is presented later.

DESCRIPTION OF THE DRAWINGS

Some embodiments of the invention are now described, by way of example only, and with reference to the accompanying drawings. The same reference number represents the same element or the same type of element on all drawings.

FIG. 6 illustrates a 5 MHz bandwidth in LTE.

FIGS. 8-10 illustrate sharing patterns in an illustrative embodiment.

DESCRIPTION OF EMBODIMENTS

The figures and the following description illustrate specific illustrative embodiments. It will thus be appreciated that those skilled in the art will be able to devise various arrangements that, although not explicitly described or shown herein, embody the principles of the embodiments and are included within the scope of the embodiments. Furthermore, any examples described herein are intended to aid in understanding the principles of the embodiments, and are to be construed as being without limitation to such specifically recited examples and conditions. As a result, the inventive concept(s) is not limited to the specific embodiments or examples described below, but by the claims and their equivalents.

Figure 1:
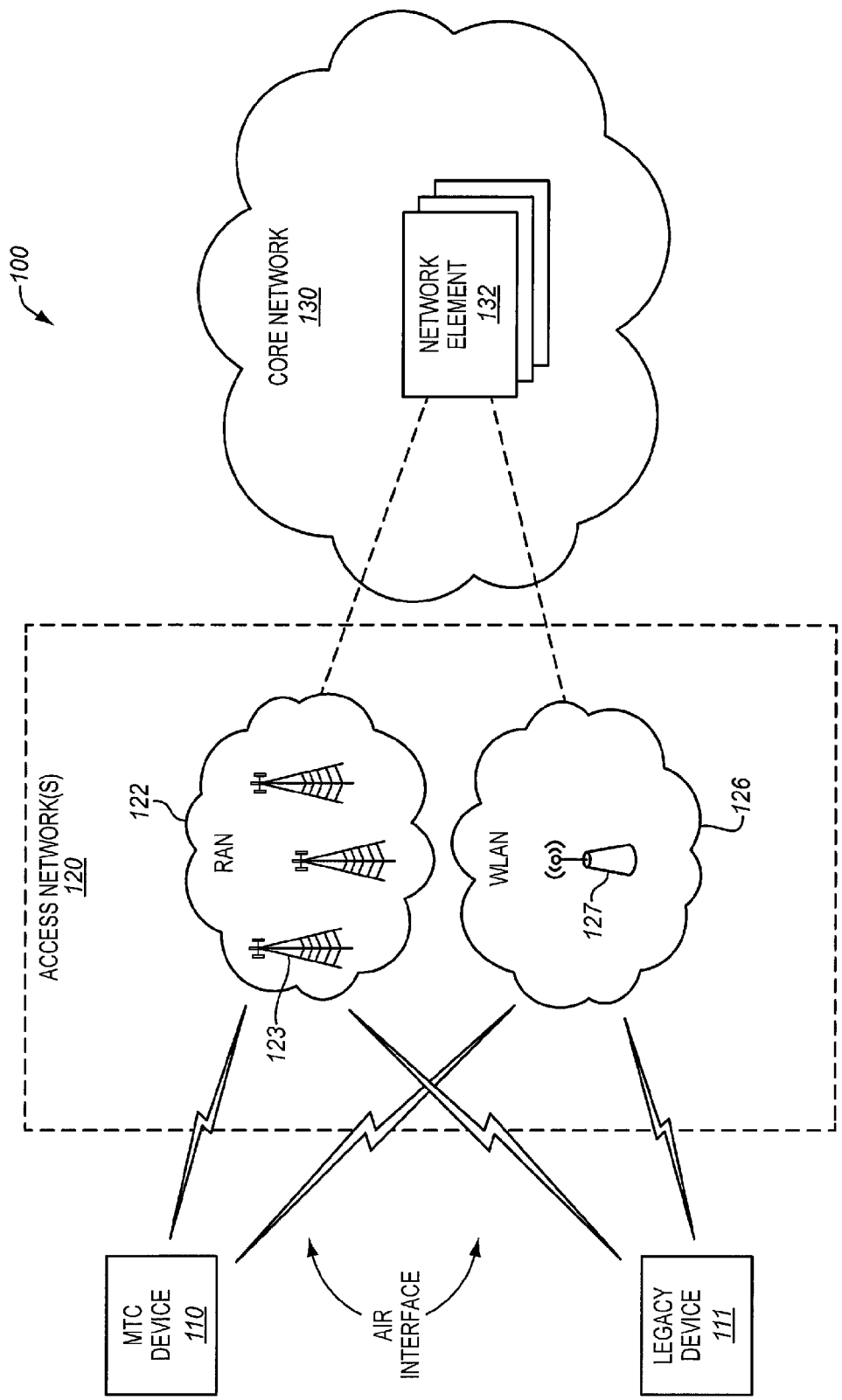
FIG. 1 illustrates a communication network in an illustrative embodiment.

FIG. 1 illustrates a communication network 100 in an illustrative embodiment. Communication network 100 is a cellular network or mobile network where the last link is wireless, and provides voice and/or data services to a plurality of devices. Communication network 100 is a Third Generation (3G), Fourth Generation (4G), or later generation network, one example of which is a Long Term Evolution (LTE) network.

Communication network 100 may provide an Internet of Things (IoT) solution, which refers to interconnection and the autonomous exchange of data between devices that are machines or parts of machines. IoT uses Machine-to-Machine (M2M) communications or Machine-Type Communications (MTC). M2M/MTC is defined as data communication between devices without the human interaction. Examples of M2M/MTC services include utility meters, vending machines, fleet management, smart traffic, real-time traffic information to a vehicle, security monitoring, medical metering and alerting, etc. M2M/MTC services work well with lower data rates than regular cellular services. For example, the Third Generation Partnership Project (3GPP) has defined new categories for LTE in Release 13, which include LTE Cat-M1 (eMTC) and Cat-NB1 (NB-IoT). Cat-M1 (also referred to as LTE Cat 1.4 MHz) has a peak rate of 1 Mbps for uplink (UL) and downlink (DL), and a bandwidth of 1.4 MHz. Cat-NB1 (also referred to as LTE Cat 200 kHz) has a peak rate of 200 kbps for DL, peak rate of 200 kbps for UL, and a bandwidth of 200 kHz. MTC-enabled devices may operate according to one of these categories for MTC within communication network 100.

Communication network 100 also provides regular high-speed wireless communications for devices and data terminals. For example, the LTE standard set forth by the 3GPP defines Cat-4. Cat-4 (in Release 8) has a peak rate of 150

Mbps for DL, a peak rate of 50 Mbps for UL, and a bandwidth of 20 MHz. These "regular" communications/transmissions in communication network 100 are referred to herein as "legacy" transmissions. Legacy transmissions are defined as non-MTC transmissions, such as voice calls, streaming video, streaming audio, or other higher-speed communications. Non-MTC devices may perform legacy transmissions (e.g., Cat-4) for non-MTC within communication network 100.

Communication network 100 is illustrated as providing communication services to devices 110-111 (along with other devices not shown) located within the same cell. Device 110 is enabled for M2M/MTC services, and is referred to as MTC device 110. MTC device 110 is configured to send and receive various types of transmissions, which may be referred to herein as MTC traffic or MTC transmissions. For example, MTC transmissions may include small data transmissions, such as sensor readings, temperature readings, control signals, etc. Device 111 is enabled for regular voice and/or data services, and is referred to as legacy device 111. Legacy device 111 may include any wireless device not classified as an MTC-enabled device. For example, legacy device 111 may include end user devices such as laptop computers, tablets, smartphones, etc. Legacy device 111 is configured to send and receive various types of transmissions, which may be referred to herein as legacy traffic, legacy transmissions, or non-MTC transmissions. For example, legacy transmissions may include voice calls, audio, video, multimedia, data, etc.

Communication network 100 includes one or more wireless access networks 120 that communicate with devices 110-111 over radio signals. One of the access networks 120 may be a Radio Access Network (RAN) 122 that includes one or more base stations 123. Base station 123 comprises an entity that uses radio communication technology to communicate with a device on the licensed spectrum, and interface the device with a core network. One example of RAN 122 is an Evolved-UMTS Terrestrial Radio Access Network (E-UTRAN) having one or more Evolved-NodeBs (eNodeB), which are base stations of the E-UTRAN.

Another one of the access networks 120 may be a Wireless Local Area Network (WLAN) 126 that includes one or more Wireless Access Points (WAP) 127. WLAN 126 is a network in which a device is able to connect to a Local Area Network (LAN) through a wireless (radio) connection. WAP 127 is a node that uses radio communication technology to communicate with a device over the unlicensed spectrum, and provides the device access to a core network. One example of WAP 127 is a WiFi access point that operates on the 2.4 GHz or 5 GHz radio bands.

Devices 110-111 are able to attach to RAN 122 and/or WLAN 126 to access a core network 130. In other words, access networks 120 represent the air interface between devices 110-111 and core network 130. Core network 130 is the central part of communication network 100 that provides various services to customers who are connected by one (or more) of access networks 120. One example of core network 130 is the Evolved Packet Core (EPC) network as suggested by the 3GPP for LTE, although a core network for later-generation networks are considered herein. Core network 130 includes one or more network elements 132, which comprise a server, device, apparatus, or equipment (including hardware) that provides services for devices 110-111. Network elements 132, particularly in an EPC network, may comprise a Mobility Management Entity (MME), a Serving Gateway (S-GW), a Packet Data Network Gateway (P-GW), etc. Within an EPC network, the user data (also referred to as the "user plane") and the signaling (also referred to as the "control plane") are separated. The MME handles the control plane within the EPC network. For instance, the MME handles the signaling related to mobility and security for E-UTRAN access. The MME is responsible for tracking and paging mobile devices in idle-mode. The S-GW and P-GW handle the user plane. The S-GW and P-GW transport IP data traffic between devices 110-111 and external IP networks (not shown). The S-GW is the point of interconnect between the radio-side and the EPC network, and serves a device 110-111 by routing incoming and outgoing IP packets. The S-GW is also the anchor point for the intra-LTE mobility (i.e., in case of handover between eNodeBs), and between LTE and other 3GPP accesses. The P-GW is the point of interconnect between the EPC network and external IP networks, and routes packets to and from the external IP networks.

IoT services as provided by communication network 100 are projected to be a driver for further growth in cellular, as billions of these devices will be deployed in the future. Thus, many MTC devices will be competing for radio resources of the air interface. For LTE-based services, the basic premise is that MTC devices will use specific radio resources of the air interface per 3GPP standards. However, allocation of an entire radio channel for each MTC device (or even a logical group of devices) can be expensive. Radio channel demands for MTC services are very low and tend to be sporadic due to the goal of conserving battery power on MTC devices. Because the usage profile of MTC devices is sporadic and involves small data transmissions, it may be beneficial to share the UL and DL channels between MTC transmissions and regular, legacy transmissions (e.g., LTE data traffic and VoLTE traffic). Thus, an access network 120 can perform radio resource allocation in a number of ways to share the radio resources of the air interface between MTC transmissions and legacy transmissions (i.e., non-MTC transmissions).

Figure 2:
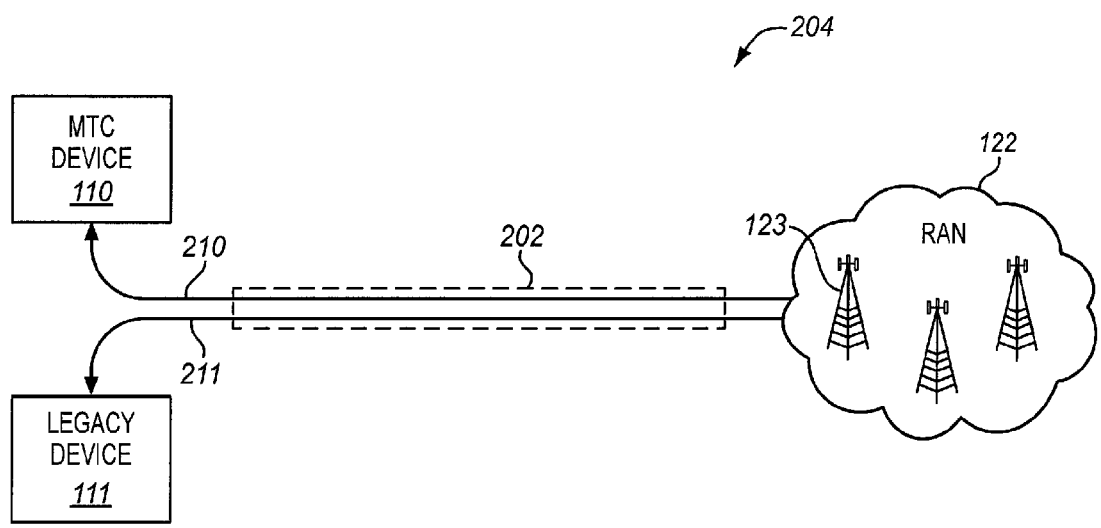
FIG. 2 illustrates radio resource sharing in an illustrative embodiment.

FIG. 2 illustrates radio resource sharing in an illustrative embodiment. FIG. 2 illustrates DL data transmissions from base station 123 to MTC device 110 and legacy device 111. In this embodiment, base station 123 provides a coverage area referred to as a cell, and has established one or more radio channels 202 with MTC device 110 and legacy device 111 that are located in the cell. The radio channels 202 are physical connections of the air interface 204 that are radio-based. Base station 123 also determines a scheduling of radio resources on radio channels 202 so that the radio resources are shared between MTC device 110 and legacy device 111. Based on the scheduling, base station 123 may send a transmission 210 over one or more of the radio channels 202 to MTC device 110 concurrently with sending a transmission 211 over one or more of radio channels 202 to legacy device 111. The transmissions 210-211 may share the radio resources of radio channels 202, such as a frame in the time domain, and the system bandwidth in the frequency domain, for an LTE air interface.

Figure 3:
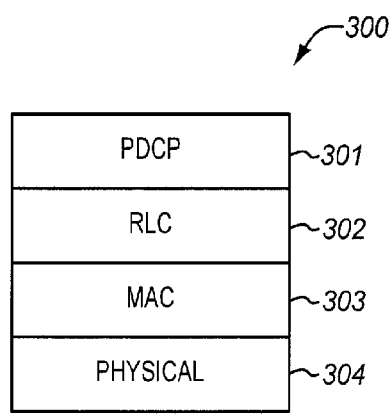
FIG. 3 illustrates the LTE protocol stack.

To understand radio resource sharing, FIGS. 3-6 illustrate the LTE air interface as an example. FIG. 3 illustrates the LTE protocol stack 300. For the user plane and the control plane, LTE protocol stack 300 includes the Packet Data Convergence Protocol (PDCP) layer 301, the Radio Link Control (RLC) layer 302, the Medium Access Control (MAC) layer 303, and the physical layer 304. The control plane will additionally include the Radio Resource Control (RRC) layer (not shown in FIG. 3), which configures the lower layers 301-304. Physical layer 304 offers data transport services between an eNodeB and User Equipment (UE)

to the higher layers 301-303. Data and signaling messages are carried on physical channels between the different levels of physical layer 304. The physical channels are divided into physical data channels and physical control channels. The physical data channels include the Physical Downlink Shared Channel (PDSCH), the Physical Broadcast Channel (PBCH), the Physical Multicast Channel (PMCH), the Physical Uplink Shared Channel (PUSCH), and the Physical Random Access Channel (PRACH). The physical control channels include the Physical Control Format Indicator Channel (PCFICH), the Physical Hybrid ARQ Indicator Channel (PHICH), the Physical Downlink Control Channel (PDCCH), and the Physical Uplink Control Channel (PUCCH). For MTC, the physical control channels also include an MTC Physical Downlink Control Channel (MPDCCH), which is a special type of PDCCH designed for bandwidth-reduced operation.

Figure 4:
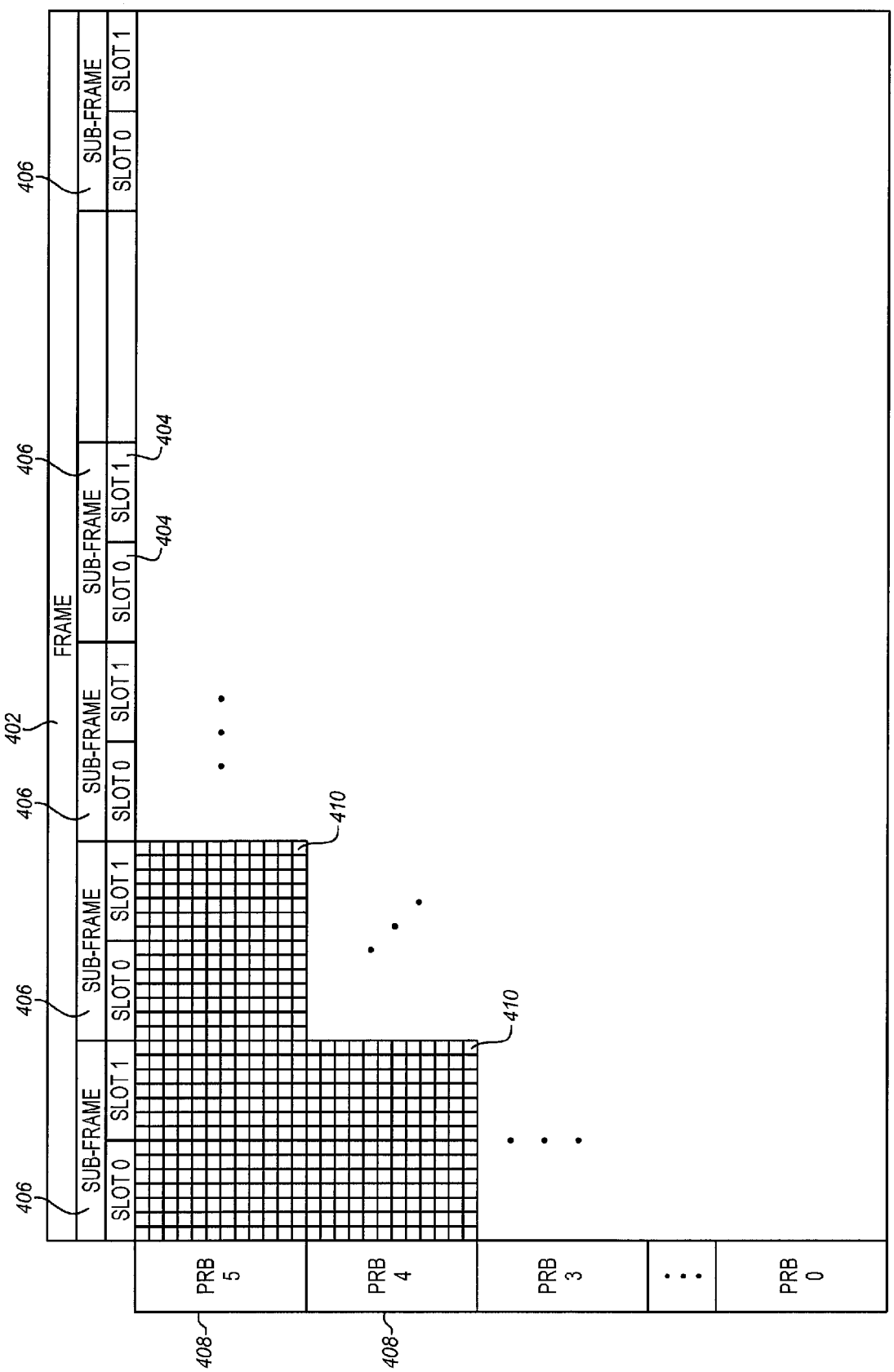
FIG. 4 illustrates a DL LTE frame structure for the LTE air interface.

LTE presently uses Orthogonal Frequency Division Multiplexing (OFDM) for the DL physical channels to transmit data in parallel over many closely-spaced sub-carriers using frames, and uses Single Carrier Frequency Division Multiple Access (SC-FDMA) for UL physical channels. FIG. 4 illustrates a DL LTE frame structure for the LTE air interface. A frame 402 has an overall length of 10 milliseconds (ms). Frame 402 is divided into twenty individual slots 404 (0.5 ms), and a sub-frame 406 is comprised of two slots 404. Thus, there are ten sub-frames 406 (1 ms) within each frame 402. Each Transmission Time Interval (TTI) consists of two slots 404 or one sub-frame 406 (1 ms). For a normal cyclic prefix, there are seven OFDM symbols per slot 404. The OFDM symbols are grouped into Physical Resource Blocks (PRB) 408 that are made up of Resource Elements (RE) 410. REs 410 are the smallest modulation structure in LTE. Each RE 410 is one subcarrier (e.g., 15 kHz) by one OFDM symbol.

Figure 5:
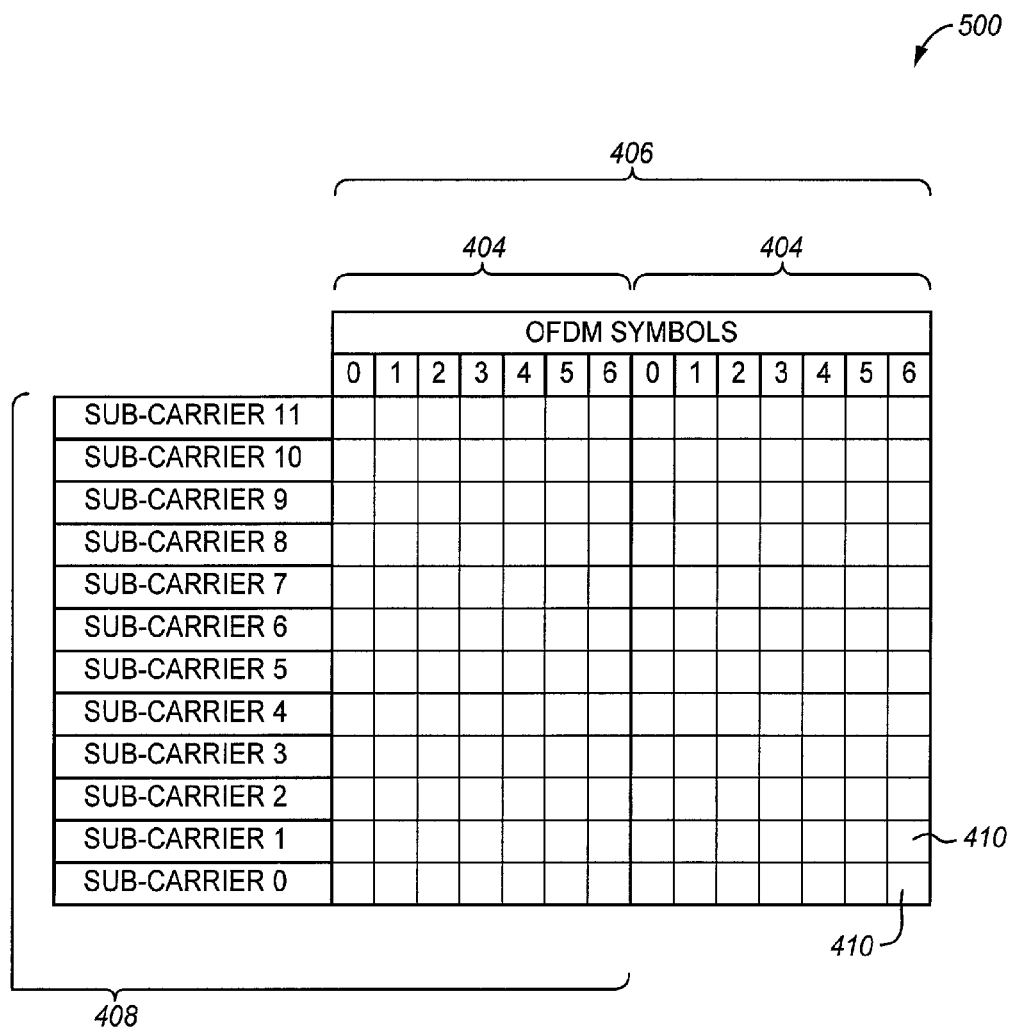
FIG. 5 illustrates a Physical Resource Block (PRB) in a time/frequency grid.

FIG. 5 illustrates a PRB 408 in a time/frequency grid 500. The time domain is shown horizontally, and the frequency domain is shown vertically in the grid 500 of FIG. 5. A PRB 408 includes twelve sub-carriers (180 kHz in total) in the frequency domain, and one slot 404 (0.5 ms) of 7 OFDM symbols in the time domain Thus, each PRB 408 comprises eighty-four REs 410 (12×7). A PRB 408 is the smallest unit of radio resources allocated to a UE. The more PRBs 408 allocated to a UE, the higher bit-rate is available to the UE. The number of PRBs 408 that are allocated to a UE at a given point in time depends on scheduling mechanisms in the time and frequency domains.

FIG. 6 illustrates a 5 MHz bandwidth in LTE. A 5 MHz bandwidth is made up of three hundred subcarriers and twenty five PRBs 408. With a total of twenty five PRBs 408, there are four narrowbands 602 (NB) available (the extra PRB is located at the center of the system bandwidth). A narrowband 602 is defined as a set of six contiguous PRBs 408. Thus, the LTE frame structure illustrated in FIG. 4 is for one narrowband.

The PRBs 408 illustrated in FIGS. 4-5 may be used for the physical data channels (e.g., PDSCH, PBCH, PUSCH, etc.) and the physical control channels (e.g., PDCCH, PUCCH, MPDCCH, etc.) for the LTE air interface. A scheduling mechanism will allocate the PRBs 408 for the physical data channels and the physical control channels at any point in time to send control information to UEs, to send data to the UEs (DL), to receive data from the UEs (UL), etc.

For MTC, two major impacts are enormous amount of devices, and limited data transmission per device. Within an LTE network, introducing Cat-M1 into an LTE network may affect legacy traffic, as Cat-M1 resource allocation competes with legacy LTE resources. A network operator cannot tolerate degradation of legacy performance when Cat-M1 traffic shares the same cell with legacy traffic. Therefore, effective sharing of radio resources in a cell between Cat-M1 traffic and legacy LTE traffic is a concern for network operators. Embodiments described herein provide for an enhanced scheduling mechanism for sharing radio resources between MTC (e.g., Cat-M1 transmissions) and non-MTC (i.e., legacy LTE transmissions) over the air interface, such as an LTE air interface.

Figure 7:
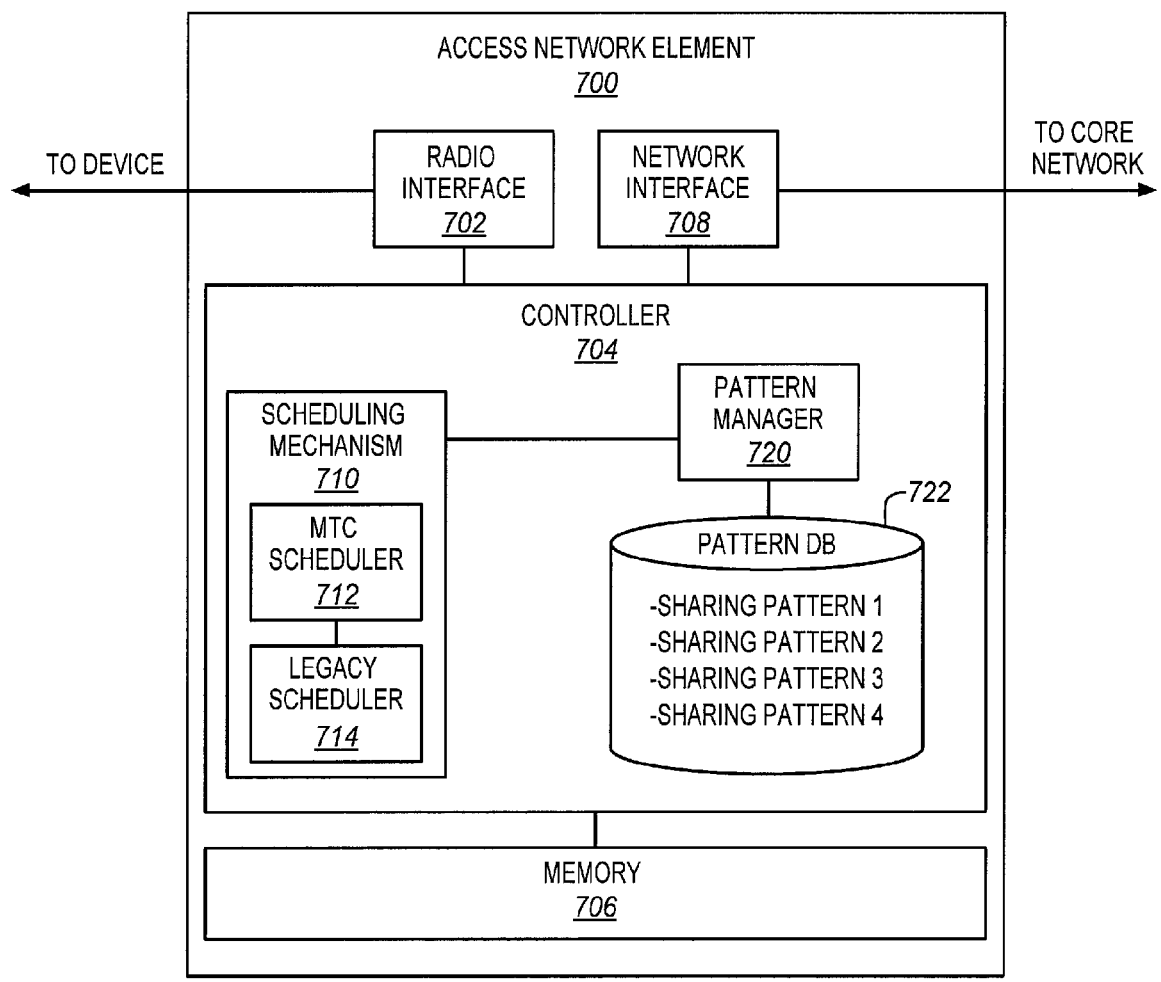
FIG. 7 is a block diagram of an access network element in an illustrative embodiment.

FIG. 7 is a block diagram of an access network element 700 in an illustrative embodiment. Access network element 700 comprises any node or collection of nodes of an access network (e.g., RAN 122 or WLAN 126), such as a base station 123, a WAP 127, a base station and associated controller, etc. Access network element 700 includes a radio interface component 702, a controller 704 (including one or more processors), a memory 706, and a network interface component 708. Radio interface component 702 represents the local radio resources of access network element 700, such as transceivers and antennas, used for wireless communications to exchange over-the-air signals. Controller 704 represents the internal circuitry, logic, hardware (e.g., a processor), software, etc., that provides the functions of access network element 700. Memory 706 is a storage unit for data, instructions, applications, etc., and is accessible by controller 704 or other devices. Network interface component 708 is an interface component that provides an interface or backhaul connection with a core network. The components of access network element 700 may be implemented on the same hardware platform (including one or more processors), or on separate platforms.

Controller 704 implements a scheduling mechanism 710. Scheduling mechanism 710 comprises a device or set of devices that schedules MTC transmissions and/or non-MTC transmissions via the radio resources of an air interface, such as an LTE air interface. Scheduling mechanism 710 may schedule only non-MTC transmissions during certain scheduling windows to devices located within a cell. Other times, scheduling mechanism 710 may schedule MTC and non-MTC transmissions, in which case the radio resources are shared between the MTC transmissions and the non-MTC transmissions. Although not shown in FIG. 7, scheduling mechanism 710 may comprise one or more processors, one or more blade servers, one or more Virtual Machines (VM) running on a hardware platform, or other hardware devices.

In one embodiment, scheduling mechanism 710 may include an MTC scheduler 712 and a legacy scheduler 714. MTC scheduler 712 is configured to schedule MTC transmissions (e.g., physical data channels and physical control channels) on the air interface. Legacy scheduler 714 is configured to schedule non-MTC or legacy transmissions (e.g., physical data channels and physical control channels) on the same air interface. MTC scheduler 712 and legacy scheduler 714 may comprise separate physical devices that are connected by an interface (e.g., a proprietary interface). Each of the separate physical devices may comprise one or more processors, one or more blade servers, one or more VMs running on a hardware platform, etc. MTC scheduler 712 and legacy scheduler 714 may alternatively comprise a shared physical device that performs the functions of both the MTC scheduler 712 and legacy scheduler 714.

Controller 704 may also include a pattern manager 720 and a pattern database (DB) 722. Pattern manager 720 is configured to manage one or more sharing patterns. A sharing pattern comprises a mapping of radio resources between MTC and non-MTC on the physical layer of an air interface. One assumption is that a multiple access modulation format (e.g., OFDM, Non-Orthogonal Multiple Access (NOMA), etc.) is used on the physical layer of the air interface that segments the physical layer into radio resources in the time domain and in the frequency domain. The radio resources may comprise PRBs, which have both a time and a frequency dimension. The radio resources may comprise sub-frames in the time domain, and narrowbands or subcarriers in the frequency domain. A sharing pattern therefore maps some radio resources to MTC and other radio resources to non-MTC. For example, a sharing pattern may map or allocate a first set of sub-frames to MTC only, and a second set of sub-frames to non-MTC only on one or more narrowbands. The sharing patterns may be predefined by pattern manager 720, by a network operator, etc., based on factors to maximize the use of the radio resources without unacceptably impacting non-MTC transmissions on the air interface. Pattern database 722 is configured to store one or more sharing patterns (e.g., sharing patterns 1-4).

The sharing patterns map radio resources to MTC and non-MTC in the time and frequency domains within a resource sharing window (e.g., a variable time period or number of TTIs). One or more sharing patterns may fit in a resource sharing window depending on the length of the resource sharing window. The sharing patterns may be designed as bandwidth independent. The sharing patterns may allocate radio resources for DL, UL, or both for control channels and data channels. The sharing patterns may also include selection criteria for selecting among a plurality of sharing patterns for a resource sharing window. The selection criteria comprise any characteristics, constraints, rules, etc., for selecting a sharing pattern. The selection criteria may include operator-defined weight factors, which allow the operator to increase or decrease MTC or non-MTC for different resource sharing windows. The selection criteria may include radio coverage conditions for MTC devices within a cell (e.g., center, edge, CAT-M1 capability, etc.). The selection criteria may include MTC traffic load and/or non-MTC traffic load in an access network. The selection criteria may include time-of-day (TOD), day-of-the-week (DOW), peak, off-peak, etc. The selection criteria may include MTC or non-MTC prioritization input from a network operator, DL/UL Hybrid Automatic Repeat Request (HARQ) retransmission requirements, Modulation and Coding Scheme (MCS) correction requirements, S1 and paging transmissions, etc. The selection criteria may include cell conditions, such as coverage, Signal-to-Interference-and-Noise Ratio (SINR), whether a device is located in urban areas, remote areas, etc. The selection criteria may include considerations for mobility, eMBMS, VoLTE traffic, etc. The selection criteria may include considerations for power saving requirements for devices.

FIGS. 8-10 illustrate sharing patterns in an illustrative embodiment. The mappings provided in FIGS. 8-10 are merely to provide exemplary mappings, and resource sharing as described herein is not limited to these sharing patterns. FIG. 8 illustrates a sharing pattern 800 (or a portion of sharing pattern 800) in an illustrative embodiment. In this embodiment, a mapping is provided for the MTC control channel (MPDCCH), a DL data channel (PDSCH), and a UL data channel (PUSCH). In a coverage enhancement mode, the MPDCCH is repeated over a plurality of sub-frames to allow a UE to determine the control information carried by the MPDCCH even in a poor coverage area. The MDPCCH is an example of control information, with the control information being any information which schedules DL radio resources for radio transmission from a base station to a UE and/or UL radio resources for radio transmission from a UE to a base station. MPDCCH, PDSCH, and PUSCH may be mapped to particular narrowbands/subcarriers which are not specifically illustrated in FIG. 8. For this mapping, MPDCCH is on a separate narrowband from PDSCH, MPDCCH repetition is four (with $R_{max}=4$), PDSCH repetition is four, PUSCH repetition is eight, and the DL Invalid BL/CE sub-frame is at sub-frame seven. Sharing pattern 800 has a 20 ms duration(=2 frames=20 sub-frames). The example in FIG. 8 shows a resource sharing window of 40 ms so that the repetition of pattern 800 is evident (i.e., pattern 800 is repeated twice in the resource sharing window).

The mapping in the time domain for sharing pattern 800 is per sub-frame. The sub-frames are illustrated as [0-9] for frame0 and [0-9] for frame1. A "U" label in a sub-frame indicates a mapping of that sub-frame for a UL MTC transmission, and a "D" label in a sub-frame indicates a mapping for a DL MTC transmission. For example, sub-frames [0-3] are mapped to the MPDCCH for UL MTC control, and sub-frames [4-6, 8] are mapped to the MPDCCH for DL MTC control. Sub-frames [7-14] are mapped to the PUSCH for UL MTC data transmission, and sub-frames [10-16, 18] are mapped to the PDSCH for DL MTC data transmission. The rest of the sub-frames that are not specifically mapped to MTC control or data are available or mapped to non-MTC (UL/DL) transmissions. Further, other radio resources not shown in FIG. 8 may also be available or mapped to non-MTC (UL/DL) transmissions.

FIG. 9 illustrates another sharing pattern 900 (or a portion of sharing pattern 900) in an illustrative embodiment. In this embodiment, the mapping is for UL MTC transmissions only. For example, sub-frames [0-3] are mapped to the MPDCCH for UL MTC control, and sub-frames [7-14] are mapped to the PUSCH for UL MTC data transmission. The rest of the sub-frames that are not specifically mapped to MTC control or data are available or mapped to non-MTC (UL/DL) transmissions.

FIG. 10 illustrates another sharing pattern 1000 (or a portion of sharing pattern 1000) in an illustrative embodiment. In this embodiment, the mapping is for DL MTC transmission only. For example, sub-frames [4-7] are mapped to the MPDCCH for DL MTC control, and sub-frames [10-16, 18] are mapped to the PDSCH for DL MTC data transmission. The rest of the sub-frames that are not specifically mapped to MTC control or data are available or mapped to non-MTC (UL/DL) transmission.

With the sharing patterns defined and stored in pattern database 722, scheduling mechanism 710 is able to schedule MTC transmissions and non-MTC transmissions over the air interface to devices located in the same cell of an access network (e.g., access network 120).

Scheduling mechanism 710 may use other policies to determine how radio resources are shared between MTC and non-MTC on the air interface. The resource sharing window may be dynamically divided into variable lengths where MTC transmissions are allowed, and where MTC transmissions are prohibited. Scheduling mechanism 710 or pattern manager 720 may define an interval of the resource sharing window where MTC is allowed. An interval is an amount of time in the time domain (e.g., a number of TTIs, a number of sub-frames, etc.). Scheduling mechanism 710 or pattern manager 720 may also define an interval where MTC is prohibited. The intervals where MTC transmissions are allowed are referred to as "MTC-On" or "Cat-M-On" intervals, and MTC transmissions (control or data) are allowed to be scheduled during these intervals. Legacy or non-MTC transmissions may also be scheduled during the MTC-On intervals, such as based on the sharing patterns described above. The intervals where MTC transmissions are prohibited are referred to as "MTC-Off" or "Cat-M-Off" intervals, and MTC transmissions (control or data) are not allowed to be scheduled during these intervals. MTC-On and MTC-Off intervals may be dynamically balanced based on traffic at MTC scheduler 712 and/or legacy scheduler 714. An algorithm is introduced herein to dynamically calculate the length (e.g., number of TTIs) of the MTC-On and MTC-Off intervals for a resource sharing window.

Figure 11:
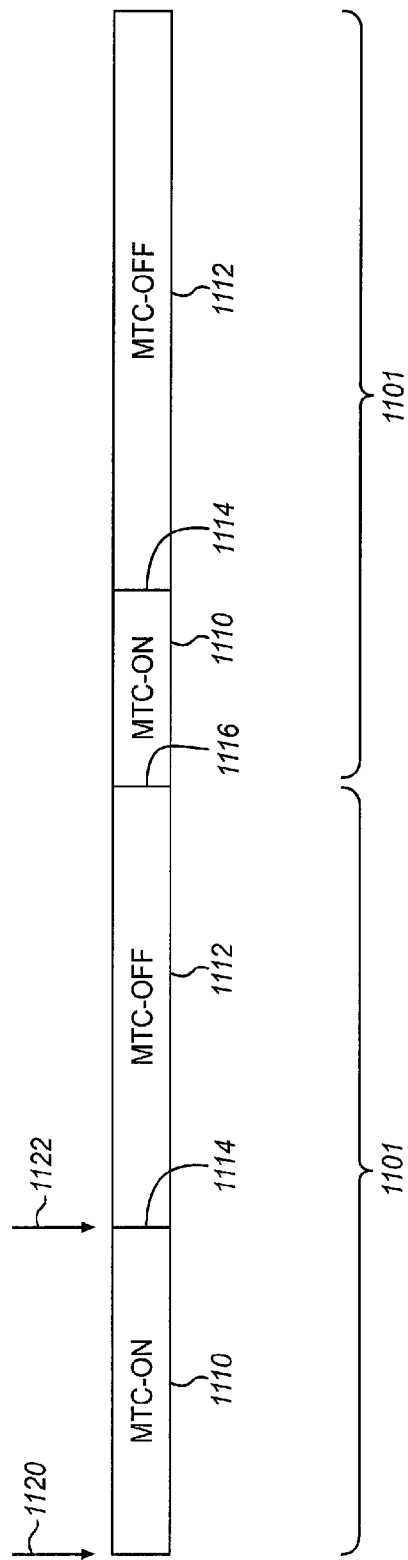
FIG. 11 illustrates resource sharing windows divided into MTC-On and MTC-Off intervals in an illustrative embodiment.

FIG. 11 illustrates resource sharing windows divided into MTC-On and MTC-Off intervals in an illustrative embodiment. FIG. 11 illustrates two resource sharing windows 1101 that are configurable in length. Within each resource sharing window 1101, there is a configurable MTC-On interval 1110 and a configurable MTC-Off interval 1112. An MTC-On interval 1110 and MTC-Off interval 1112 are sequential in time for the duration of a resource sharing window 1101. Each interval 1110 and 1112 has a start time 1120 (i.e., a beginning) and an end time 1122 (i.e., an end). There is a transition 1114 from an MTC-On interval 1110 to the next MTC-Off interval 1112 within the same resource sharing window 1101, and a transition 1116 from an MTC-Off interval 1112 to the next MTC-On interval 1110 within the next resource sharing window 1101.

The resource sharing windows 1101 may fulfill the following conditions:
1) Times of MPDCCH scheduling period ($r_{max}*G$); and
2) Start from K0.

These conditions ensure that MTC transmissions may be scheduled from the beginning of each resource sharing window 1101. In a resource sharing window 1101, a portion of the time is for MTC (i.e., MTC-On), and the other portion is for legacy or non-MTC (MTC-Off). An MTC device may only be scheduled to use radio resources that are mapped to MTC during MTC-On intervals 1110, such as indicated in the sharing patterns above. A legacy device may use radio resources that are mapped to MTC during MTC-Off intervals 1112. The duration of an MTC-On interval 1110 and an MTC-Off interval 1112 may be updated for each resource sharing window 1101.

In defining the intervals for a resource sharing window 1101, the minimum MTC-On interval 1110 may be defined as $K*r_{max}*G$, where K is an index controlled by a configurable parameter, $r_{max}$ is maximum number of MPDCCH repetition given by a higher layer (e.g., RRC message), and G is the MPDCCH start sub-frame in common search space given by the higher layer (e.g., RRC message). The minimum length of an MTC-On interval 1110 should be long enough to accommodate at least one UL or DL data transmission (it is not the period that can guarantee to finish one HARQ process which can take multiple retransmissions).

Figure 12:
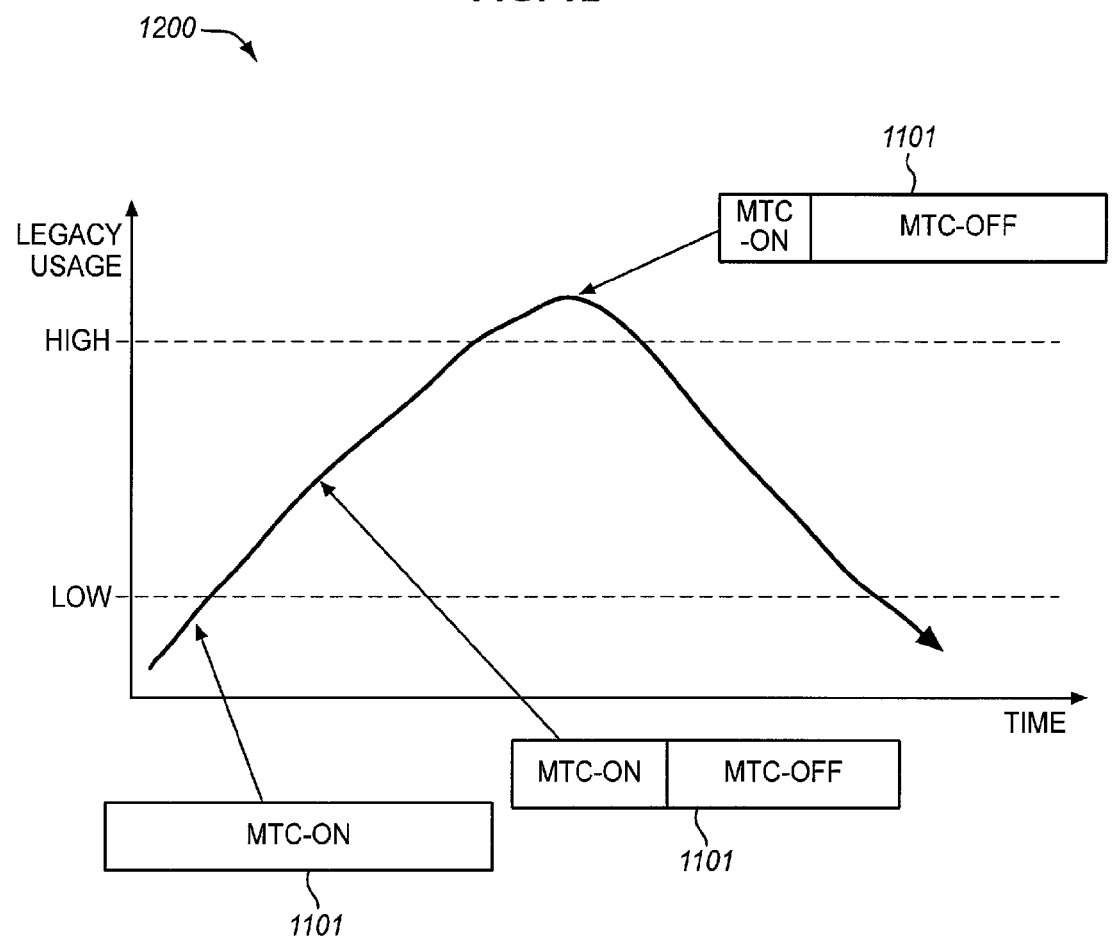
FIG. 12 is a graph illustrating how legacy usage affects resource sharing windows in an illustrative embodiment.

At the end of each resource sharing window 1101, scheduling mechanism 710 may determine the duration of the MTC-On interval 1110 and MTC-Off interval 1112 in the next resource sharing window 1101. Scheduling mechanism 710 may determine legacy traffic load and/or MTC traffic load when determining the duration of the MTC-On interval 1110 and MTC-Off interval 1112 in the next resource sharing window 1101. FIG. 12 is a graph 1200 illustrating how legacy usage affects resource sharing windows in an illustrative embodiment. Graph 1200 illustrates legacy usage or traffic load over time. When legacy usage is low, scheduling mechanism 710 may define an MTC-On interval for the entirety of the resource sharing window 1101. As legacy usage increases, scheduling mechanism 710 may increase the MTC-Off interval and reduce the MTC-On interval (i.e., based on an algorithm) in a resource sharing window 1101 to ensure that MTC traffic does not unduly interfere with legacy traffic. When legacy usage is high, scheduling mechanism 710 may further reduce the MTC-On interval in a resource sharing window 1101.

Figure 13:
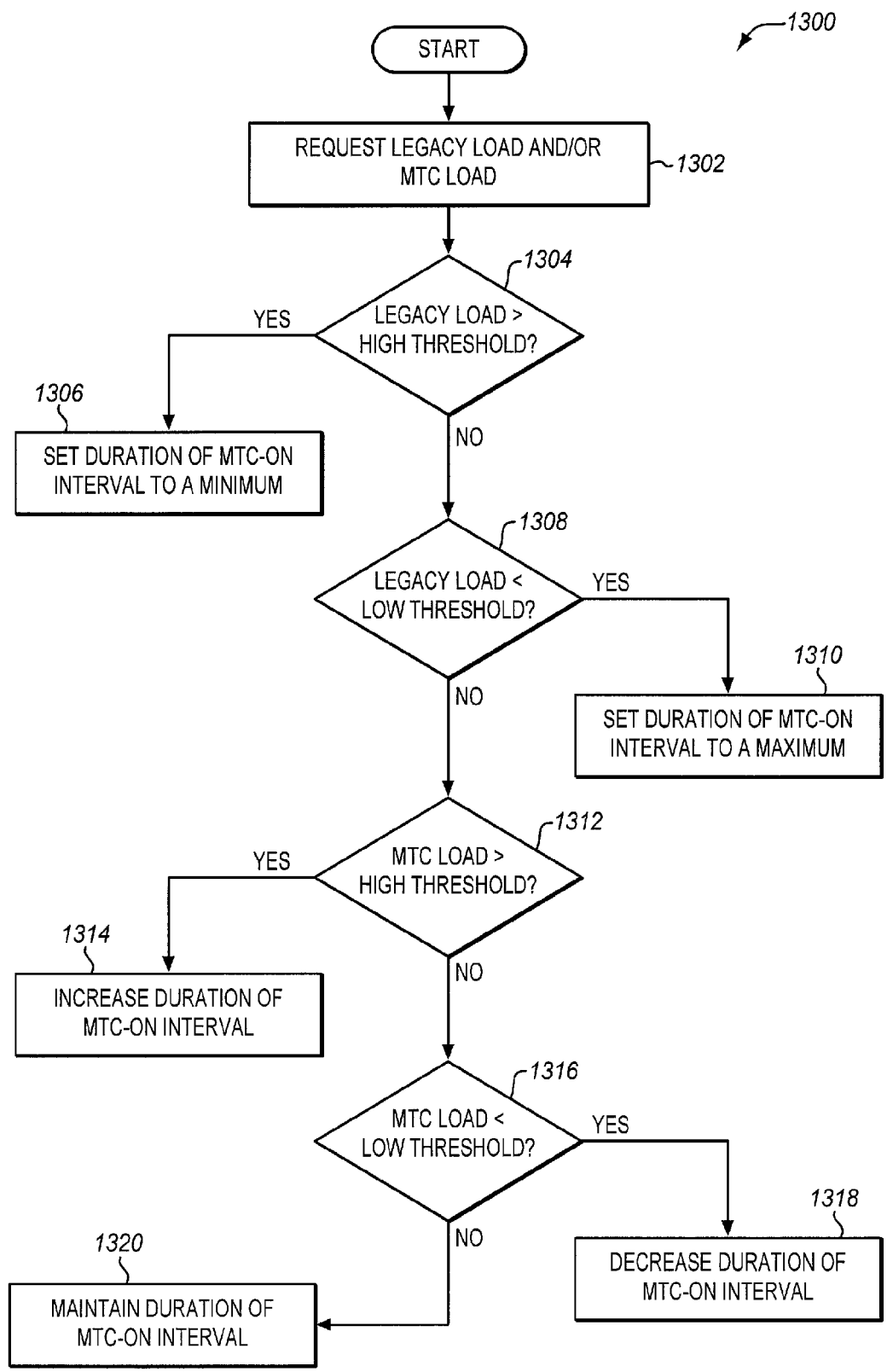
FIG. 13 is a flow chart illustrating a method of updating a resource sharing window in an illustrative embodiment.

FIG. 13 is a flow chart illustrating a method 1300 of updating a resource sharing window in an illustrative embodiment. The steps of method 1300 will be described with reference to access network element 700 in FIG. 7, but those skilled in the art will appreciate that method 1300 may be performed in other devices. Also, the steps of the flow charts described herein are not all inclusive and may include other steps not shown, and the steps may be performed in an alternative order.

To begin, scheduling mechanism 710 requests the legacy load and/or MTC load in a cell of an access network (step 1302). The legacy load may be monitored by average PRB usage or average buffer size waiting for grant in legacy scheduler 714. The MTC load may be monitored by real-time usage during a prior MTC-On interval or average buffer size waiting for grant in MTC scheduler 712. Scheduling mechanism 710 determines whether the legacy load exceeds a high threshold (step 1304). If the decision in step 1304 is "yes", then scheduling mechanism 710 sets the duration of the MTC-On interval for the next resource sharing window to a minimum (step 1306). If the decision in step 1304 is "no", then scheduling mechanism 710 determines whether the legacy load is less than a low threshold (step 1308). If the decision in step 1308 is "yes", then scheduling mechanism 710 sets the duration of the MTC-On interval to a maximum (step 1310), which may be for the entirety of the next resource sharing window. If the decision in step 1308 is "no", then scheduling mechanism 710 determines whether the MTC load exceeds a high threshold (step 1312). If the decision in step 1312 is "yes", then scheduling mechanism 710 increases the duration of the MTC-On interval for the next resource sharing window (step 1314), such as by an increment or amount (e.g., number of TTIs). If the decision in step 1312 is "no", then scheduling mechanism 710 determines whether the MTC load is less than a low threshold (step 1316). If the decision in step 1316 is "yes", then scheduling mechanism 710 decreases the duration of the MTC-On interval for the next resource sharing window (step 1318), such as by an increment or amount (e.g., number of TTIs). The increment size for increasing and decreasing the duration of the MTC-On interval may be different and is configurable, such as one MTC HARQ Round Trip Time (RTT). If the decision in step 1316 is "no", then scheduling mechanism 710 maintains the durations of the MTC-On interval and the MTC-Off interval in the next resource sharing window (step 1320). Method 1300 may then repeat for subsequent resource sharing windows to accommodate charging traffic loads within a cell/access network.

To summarize the above description, some radio resources (e.g., PRBs) of the air interface are mapped to MTC and other radio resources are mapped to non-MTC or legacy transmissions, such as indicated in the sharing patterns. Also, MTC-On and MTC-Off intervals are defined for a resource sharing window. Scheduling mechanism 710 considers the mapping of the radio resources between MTC and non-MTC, and the MTC-On and MTC-Off intervals when scheduling transmissions for devices in a cell. To schedule a transmission for a device, scheduling mechanism 710 will consider channel quality (i.e., radio conditions) and network load. Radio conditions in a cell can impact bit rates available to a device (better radio conditions allow for higher bit rates). A device may report radio conditions to a base station (e.g., eNodeB) in the form of a Channel Quality Indicator (CQI), such as for a DL scheduling. The base station may also estimate channel quality for uplink scheduling based on a Sounding Reference Signal (SRS), a Demodulation Reference Signal (DMRS), etc. Scheduling mechanism 710 will select an MCS for the device based on channel quality. An MCS that is selected for a device based on channel quality is referred to herein as a "standard" MCS. An MCS is a combination of modulation (e.g., QPSK, 64-QAM), coding rate (e.g., ½, ¾), guard interval (800 or 400 ns), number of spatial streams, etc. A higher MCS means that more payload bits can be transmitted per time unit. Scheduling mechanism 710 may use a lookup table to determine a modulation and code rate based on the channel quality, such as shown in Tables 7.2.3-2 and 7.2.3-3 in 3GPP TS 36.213 (version 14.3.0) for DL channels. Based on the modulation and code rate, scheduling mechanism 710 may determine an MCS index for the device.

Scheduling mechanism 710 also allocates a set of available radio resources to the device, such as a number of PRBs ($N_{PRB}$). Scheduling mechanism 710 may determine a Transport Block Size (TBS) for the device based on the MCS index and $N_{PRB}$. TBS indicates how many payload bits are transferred in a 1 ms (i.e., one TTI) transport block size. To determine TBS, scheduling mechanism 710 may use a lookup table to determine a TBS index based on the MCS index, such as shown in Tables 7.1.7.1-1 and 7.1.7.1-1A in 3GPP TS 36.213. Scheduling mechanism 710 may then use a lookup table to determine a TBS based on the TBS index and $N_{PRB}$, such as shown in Table 7.1.7.2.1-1. At this point, scheduling mechanism 710 knows how many bits can be transmitted per one TTI, and schedules UL and DL transmissions for the device accordingly.

The MAC layer performs the modulation of data (i.e., the payload) into the PRBs of the physical layer. The MAC layer (and higher layers) also provides mechanisms to detect and correct errors in the transmission of data. One mechanism is a HARQ process, which is used to correct errors in data sent over the physical layer. For a HARQ process, when a transmitting entity transmits data to a destination using radio resources, the transmitting entity stops and waits until it receives an acknowledgment (ACK) or negative acknowledgement (NACK) back from the destination before transmitting the next block of data or retransmitting the same data block. If data is successfully received and decoded, then the destination sends an ACK to the transmitting entity. If the data has an error, then the destination buffers the data and requests a re-transmission from the transmitting entity (NACK). When the destination receives the re-transmitted data, it combines the re-transmitted data with the buffered data prior to channel decoding and error detection.

In the embodiments described herein, radio resources that are mapped to MTC may be allocated to a legacy device during an MTC-Off interval. If a HARQ process is not able to complete for a legacy device during the MTC-Off interval, then the HARQ process will be suspended to avoid collision with the next MTC-On interval where these radio resources are to be used for MTC transmissions. The suspension of HARQ processes will impact the performance of legacy transmissions, and it is therefore desirable for the HARQ processes for legacy devices to finish during an MTC-Off interval.

Figure 14:
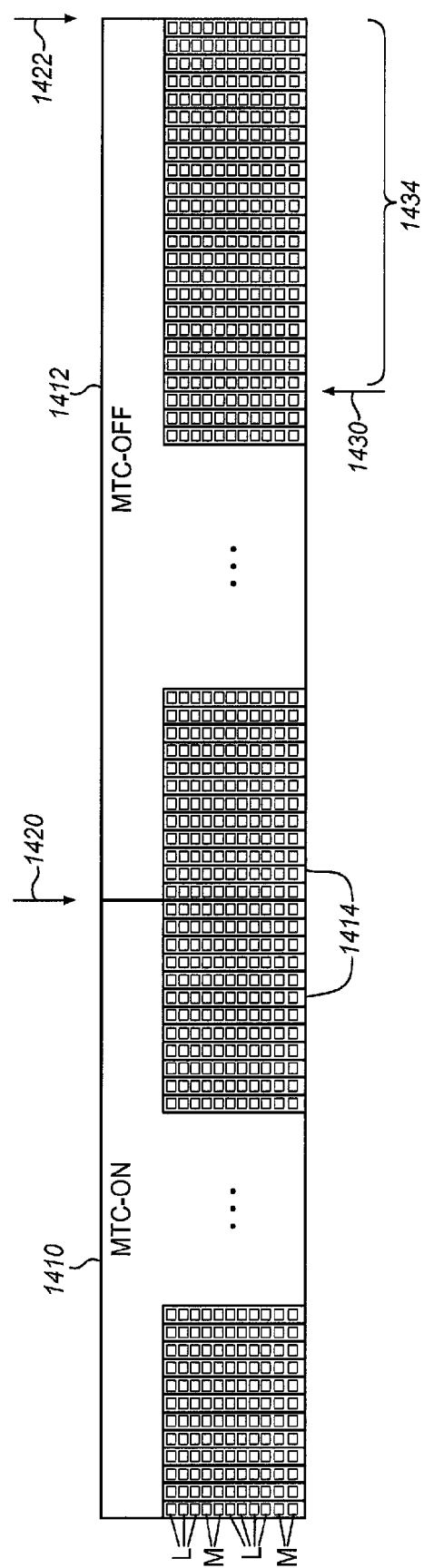
FIG. 14 illustrates a resource sharing window with MCS correction in an MTC-Off interval in an illustrative embodiment.

To assist the completion of HARQ processes for legacy devices during an MTC-Off interval, MCS correction is implemented toward the end of the MTC-Off interval. FIG. 14 illustrates a resource sharing window 1401 with MCS correction in the MTC-Off interval in an illustrative embodiment. As above, resource sharing window 1401 is comprised of a configurable MTC-On interval 1410 and a configurable MTC-Off interval 1412. MTC-On interval 1410 and MTC-Off interval 1412 each have a length in the time domain of one or more TTIs 1414. Within each TTI 1414, some radio resources are mapped to MTC (denoted by "M") and other radio resources are mapped to non-MTC or legacy transmissions (denoted by "L"). MTC radio resources and legacy radio resources may be scheduled to legacy devices during MTC-Off interval 1412. MTC-Off interval 1412 has a beginning 1420 and an end 1422, and a threshold time 1430 is defined in MTC-Off interval 1412 before the end 1422 of MTC-Off interval 1412, which is an amount of time, a number of TTIs, etc. Between the threshold time 1430 and the end 1422 of MTC-Off interval 1412, an adjustment period 1434 is defined. Adjustment period 1434 is a time period toward the end 1422 of MTC-Off interval 1412 where MCS correction may be performed. Adjustment period 1434 is configurable, and may be adjusted by scheduling mechanism 710, a network operator, etc.

Figure 15:
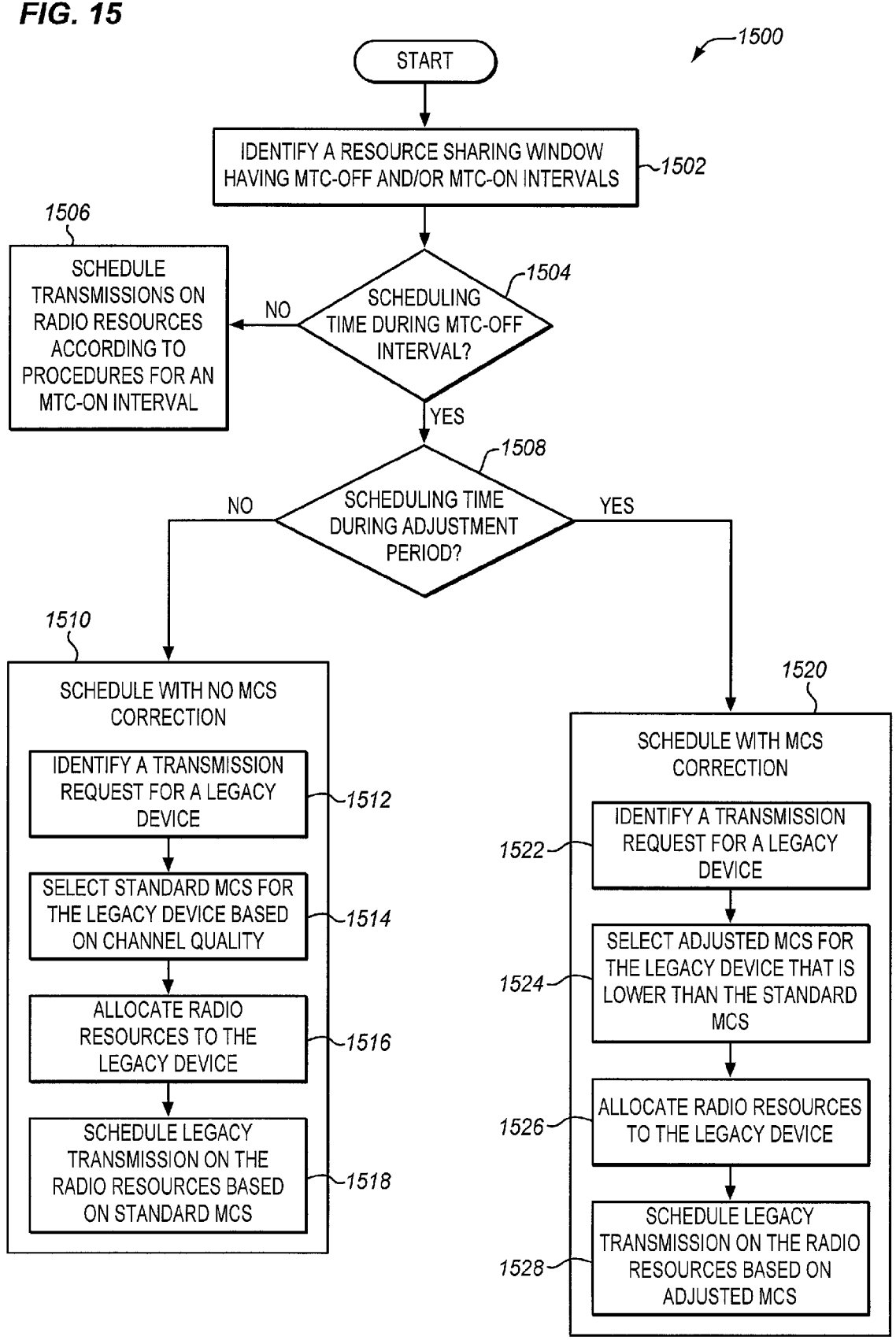
FIG. 15 is a flow chart illustrating a method of sharing radio resources between MTC and non-MTC in an illustrative embodiment.

FIG. 15 is a flow chart illustrating a method 1500 of sharing radio resources between MTC and non-MTC in an illustrative embodiment. The steps of method 1500 will be described with reference to access network element 700 in FIG. 7, but those skilled in the art will appreciate that method 1500 may be performed in other devices.

It is assumed in this embodiment that one or more sharing patterns are defined as described above to map radio resources to MTC and non-MTC. It is also assumed that one or more legacy devices have attached to a cell of access network element 700. When scheduling the radio resources for the devices that it serves, scheduling mechanism 710 identifies a resource sharing window 1401 having an MTC-On interval 1410 and/or an MTC-Off interval 1412 (step 1502). Scheduling mechanism 710 may dynamically determine the resource sharing window 1401 and the durations of MTC-On interval 1410 and MTC-Off interval 1412 as described above, or may identify resource sharing window 1401 as determined by another element (e.g., pattern manager 720). During the resource sharing window 1401, scheduling mechanism 710 will allocate radio resources to the TTIs of resource sharing window 1401 sequentially from left to right in FIG. 14. The time or TTI of resource sharing window 1401 at any point in time is referred to as the scheduling time. As scheduling mechanism 710 proceeds through resource sharing window 1401, scheduling mechanism 710 determines whether the scheduling time is during an MTC-Off interval 1412 (step 1504). If the scheduling time is not during an MTC-Off interval 1412 and is during an MTC-On interval 1410, then scheduling mechanism 710 schedules transmissions on radio resources according to procedures for an MTC-On interval 1412 (step 1506), which is outside the scope of this disclosure. If the scheduling time is during an MTC-Off interval 1412, then scheduling mechanism 710 determines whether the scheduling time is during the adjustment period 1434 (step 1508). If the scheduling time is before the adjustment period 1434, then no MCS correction is performed (step 1510). With no MCS correction, scheduling may be performed as follows. Scheduling mechanism 710 identifies a transmission request for a legacy device (step 1512). The request may indicate the payload to be sent to the legacy device for a DL transmission, or the payload to be received from the legacy device for an UL transmission. Scheduling mechanism 710 selects a standard MCS for the legacy device based on channel quality information (e.g., CQI, SRS, DMRS) for the legacy device (step 1514). The channel quality information comprises any information indicating how good or bad radio signals are for a communication channel. Channel quality information may be reported by the legacy device, such as with a CQI, or may be estimated based on signals exchanged with the legacy device, such as with SRS and/or DMRS. Scheduling mechanism 710 also allocates a set of radio resources (i.e., a number of radio resources) to the legacy device (step 1516). During an MTC-Off interval 1412, some or all of the radio resources allocated to the legacy device may be mapped to MTC. For example, assume that four PRBs are allocated to the legacy device. In this embodiment, one or more of the PRBs allocated to the legacy device may be mapped to MTC during an MTC-Off interval 1412. Scheduling mechanism 710 then schedules a legacy transmission for the legacy device on the radio resources based on the standard MCS (step 1518). This process may repeat for multiple legacy devices during MTC-Off interval 1412 before adjustment period 1434.

If the scheduling time is during the adjustment period 1434, then MCS correction is performed (step 1520). For MCS correction, scheduling may be performed as follows. Scheduling mechanism 710 identifies a transmission request for a legacy device (step 1522). Scheduling mechanism 710 selects an adjusted MCS (e.g., selects among multiple adjusted MCSs) for the legacy device that is lower than the standard MCS (step 1524). An adjusted MCS as described herein is a lower or downgraded MCS as compared to the standard MCS, which is selected based on channel quality. The adjusted MCS may have a lower MCS index, may have a lower modulation, a lower coding rate, etc. Scheduling mechanism 710 also allocates a set of radio resources (i.e., a number of radio resources) to the legacy device (step 1526). Again, some or all of the radio resources allocated to the legacy device may be mapped to MTC. Scheduling mechanism 710 then schedules a legacy transmission for the legacy device on the radio resources based on the adjusted MCS (step 1528). This process may repeat for multiple legacy devices during the adjustment period 1434.

By using a lower MCS during the adjustment period 1434 (i.e., toward the end of an MTC-Off interval 1412), radio resources (i.e., PRBs) for the legacy transmission will include less payload bits and more redundancy and error correction bits. Thus, there is a higher likelihood that the legacy transmission will be successfully received and decoded at the destination (i.e., the legacy device or base station). One technical benefit is that a HARQ process for the legacy transmission will more likely complete before the end of the MTC-Off interval 1412. Assume, for example, that a standard MCS is selected for a legacy device based on channel quality (step 1514) and the channel quality for the legacy device degrades (e.g., a noisy environment). In this example, the destination may not be able to successfully receive and decode the legacy transmission. Thus, it will send a NACK during the HARQ process which will trigger a re-transmission by the transmitting entity. The destination will continue to send NACKs until the legacy transmission is successfully received and decoded. But if channel quality remains low, the HARQ process may not complete before the end of an MTC-Off interval 1412, which is undesirable. To avoid this situation, the MCS is lowered in the adjustment period, which is toward the end of an MTC-Off interval 1412. With a lower MCS, the radio resources include more redundancy/error correction bits and less payload bits, which means it is more likely that a legacy transmission will be successful received and decoded by the destination. Thus, the HARQ process for the legacy transmission will complete faster and before the end of an MTC-Off interval 1412 when an adjusted MCS is used.

During the adjustment period 1434, scheduling mechanism 710 may select among a plurality of adjusted MCSs for the legacy device that are lower than the standard MCS. The adjusted MCSs may decrease (e.g., incrementally) from the threshold time 1430 to the end of the MTC-Off interval 1412. One way to adjust MCS during the adjustment period 1434 is to adjust SINR attributed to the legacy device, as is further described in FIG. 16.

Figure 16:
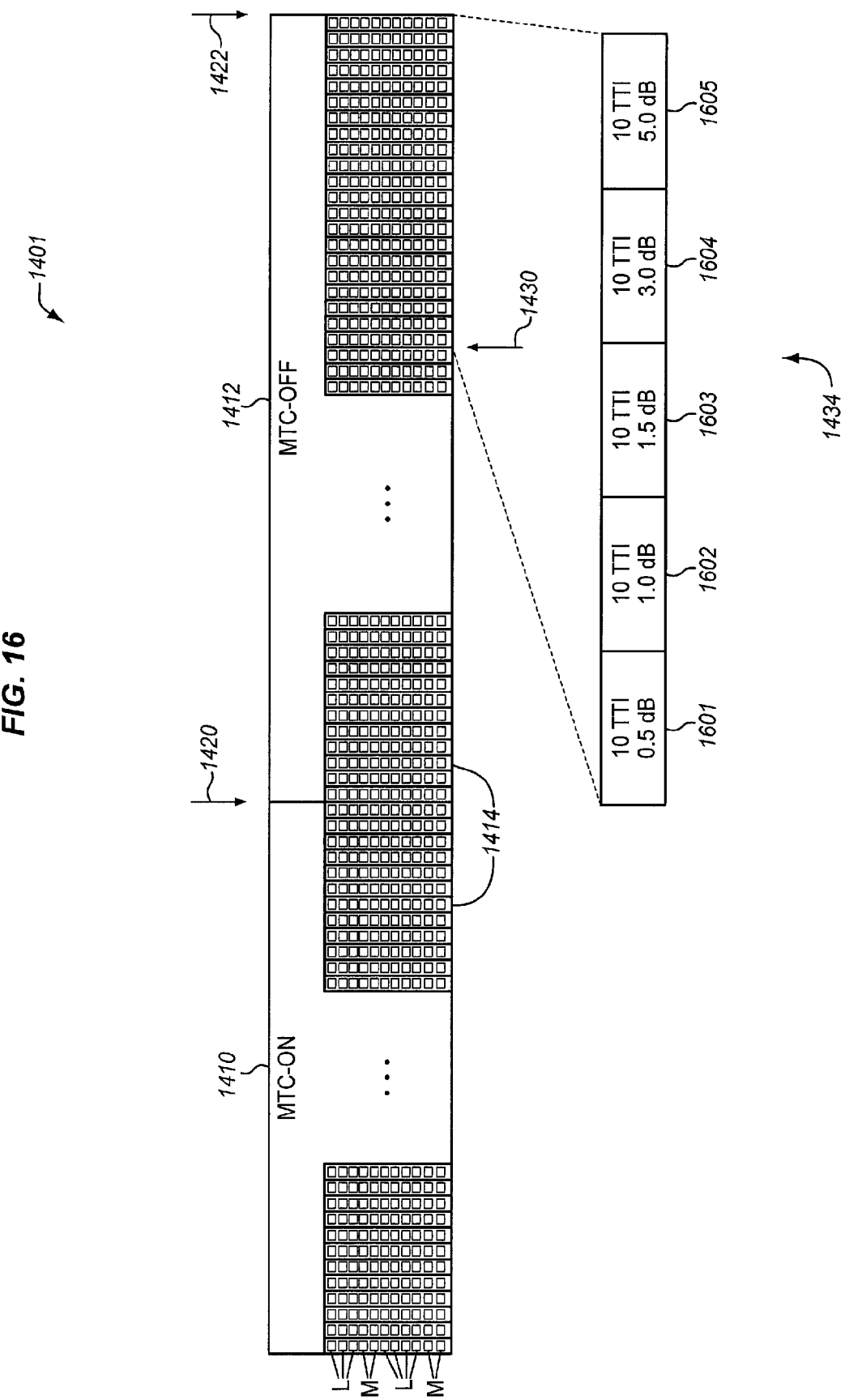
FIG. 16 illustrates an adjustment period of an MTC-Off interval in an illustrative embodiment.

FIG. 16 illustrates the adjustment period 1434 of an MTC-Off interval 1412 in an illustrative embodiment. In this embodiment, adjustment period 1434 is a configurable time period from the threshold time 1430 to the end 1422 of the MTC-Off interval 1412. The length of adjustment period 1434 is shown as 50 TTI in this example. Adjustment period 1434 comprises a plurality of sub-periods 1601-1605 in sequence. The length of each sub-period 1601-1605 is configurable, and is shown as 10 TTIs in this example. Each sub-period 1601-1605 specifies or defines a SINR reduction value. For example, sub-period 1601 specifies a SINR reduction value of 0.5 dB, sub-period 1602 specifies a SINR reduction value of 1.0 dB, sub-period 1603 specifies a SINR reduction value of 1.5 dB, sub-period 1604 specifies a SINR reduction value of 3.0 dB, and sub-period 1605 specifies a SINR reduction value of 5.0 dB. The SINR reduction values increase from sub-period 1601 to sub-period 1605. Scheduling mechanism 710 may select an adjusted MCS during the adjustment period 1434 using the SINR reduction values, as is further described in FIG. 17.

Figure 17:
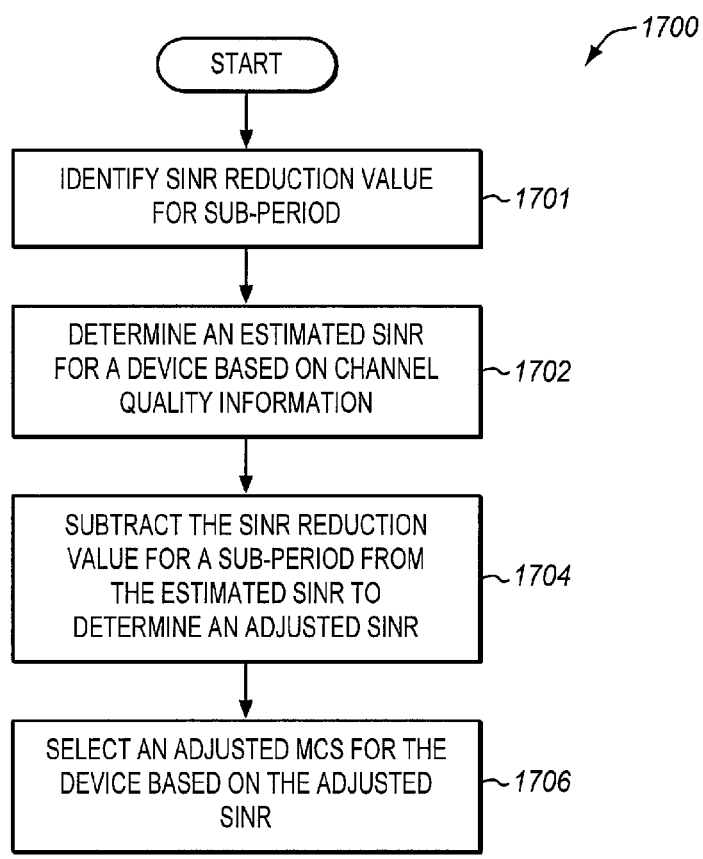
FIG. 17 is a flow chart illustrating a method of selecting adjusted MCSs during an adjustment period in an illustrative embodiment.

FIG. 17 is a flow chart illustrating a method 1700 of selecting adjusted MCSs during the adjustment period 1434 in an illustrative embodiment. The steps of method 1700 will be described with reference to access network element 700 in FIG. 7, but those skilled in the art will appreciate that method 1700 may be performed in other devices.

As described above, SINR is one metric used to determine the channel quality for a device. When scheduling mechanism 710 receives a CQI for a device or estimates channel quality based on SRS/DMRS, it can estimate an SINR for the device, and adjust the SINR based on the SINR reduction value for a sub-period 1601-1605. Thus, for a sub-period 1601-1605, scheduling mechanism 710 identifies the SINR reduction value for the sub-period (step 1701). Scheduling mechanism 710 determines an estimated SINR for a device based on channel quality information for the device (step 1702), and subtracts the SINR reduction value for the sub-period from the estimated SINR to determine an adjusted SINR for the device (step 1704). In one example, assume that the estimated SINR for the device is 20 dB. For sub-period 1601, the SINR reduction value is 0.5 dB, so scheduling mechanism 710 would subtract 0.5 dB from 20 dB to determine an adjusted SINR of 19.5 dB. Scheduling mechanism 710 then selects an adjusted MCS for the device based on the adjusted SINR (step 1706). For example, scheduling mechanism 710 may determine an adjusted CQI for the device based on the adjusted SINR, and select the adjusted MCS based on the adjusted CQI, such as with a lookup table shown in Tables 7.2.3-2 and 7.2.3-3 in 3GPP TS 36.213. The adjusted MCS is lower than the standard MCS selected for the device based on channel quality.

Scheduling mechanism 710 may repeat method 1700 during each sub-period 1601-1605 of the adjustment period 1434. As the SINR reduction values increase in the sub-periods 1601-1605, the adjusted SINR for devices will decrease. In essence, the lower SINR simulates a lower channel quality for the devices to scheduling mechanism 710. Thus, the closer the scheduling time gets to the end 1422 of the MTC-Off interval 1412, a lower SINR is simulated for the devices so that a lower MCS will be selected for the devices. The lower MCS will help ensure that HARQ processes for the devices will complete before the end of the MTC-Off interval 1412.

Figure 18:
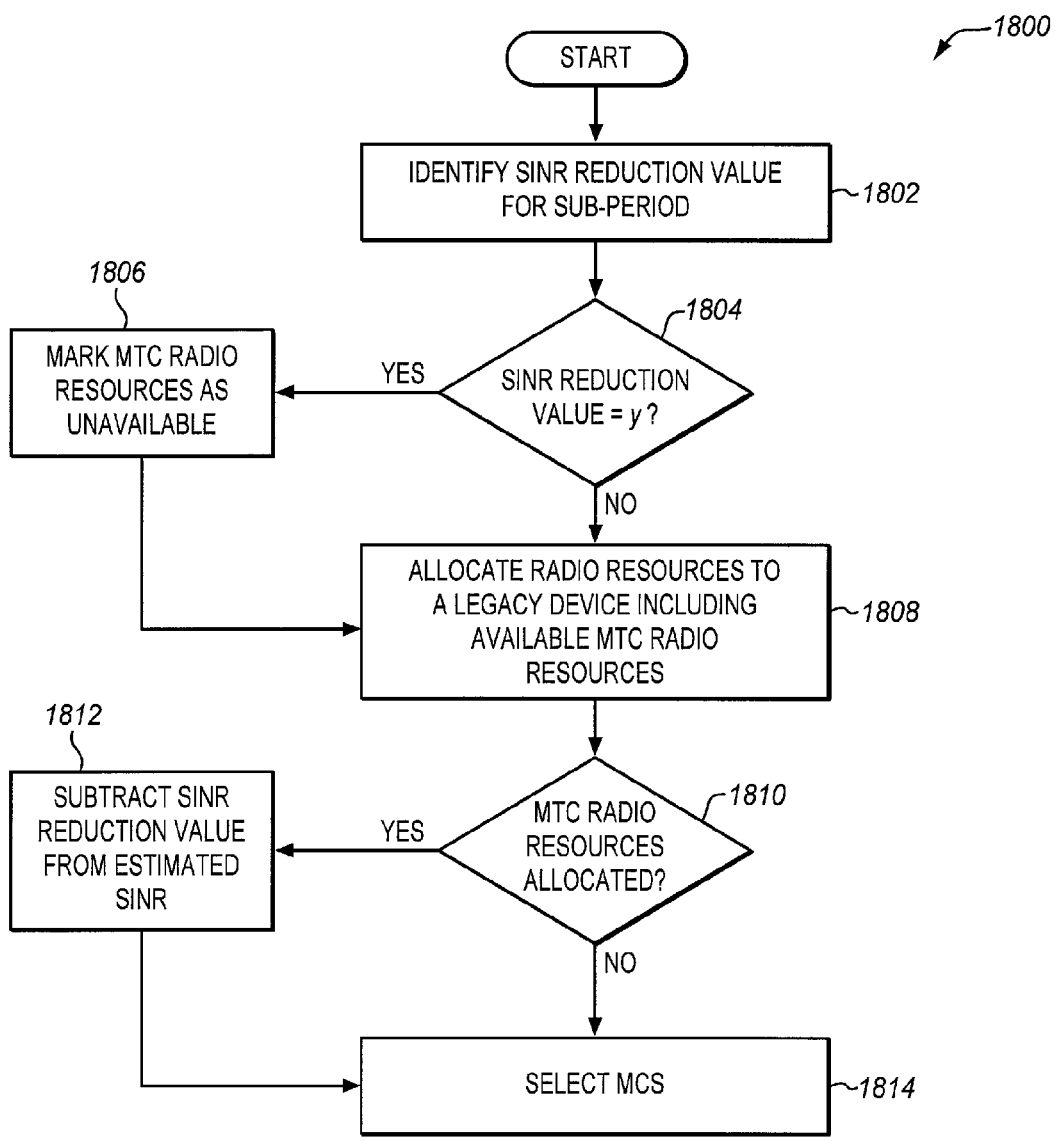
FIG. 18 is a flow chart illustrating a method of MCS correction for UL transmissions in an illustrative embodiment.
Figure 19:
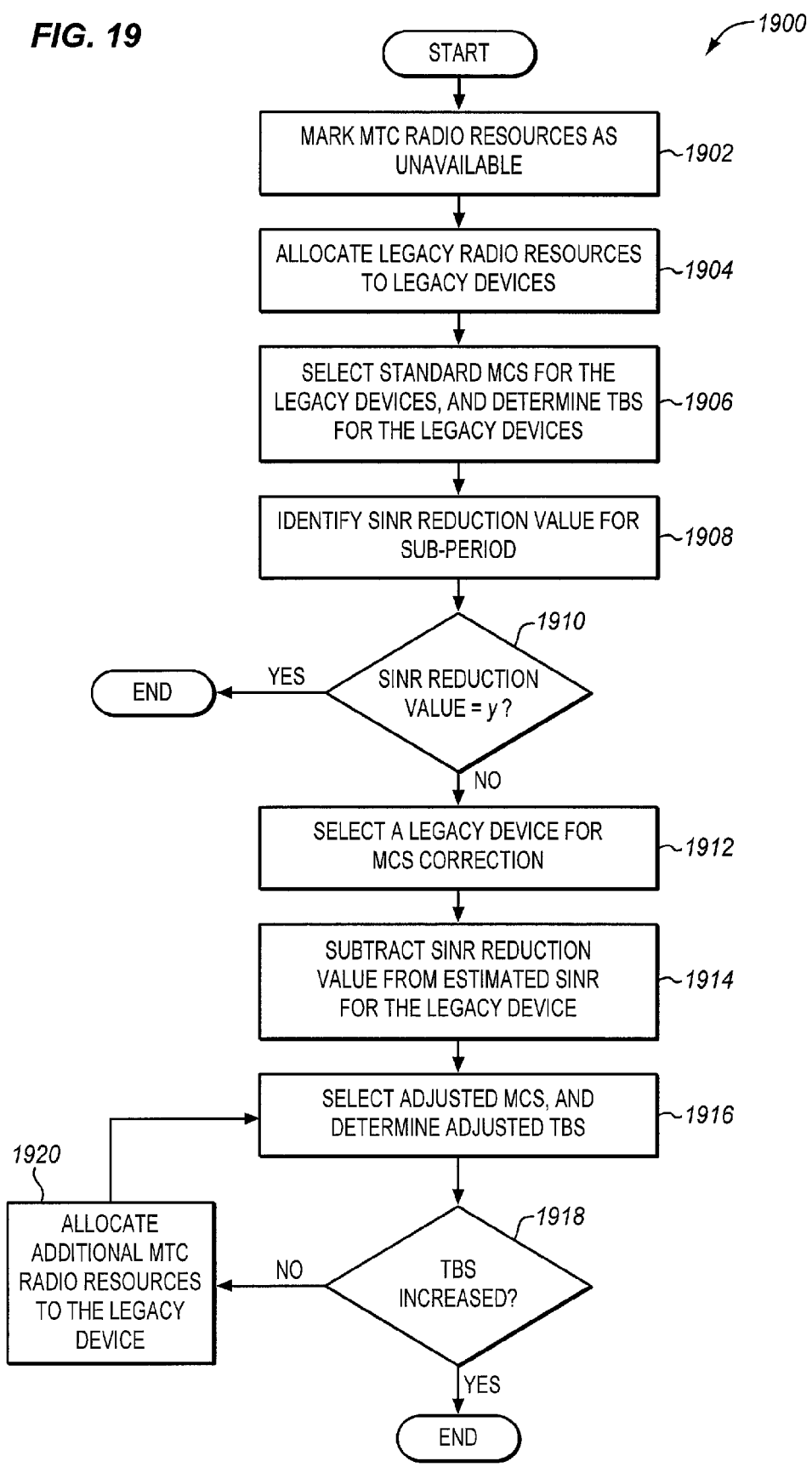
FIG. 19 is a flow chart illustrating a method of MCS correction for DL transmissions in an illustrative embodiment.

FIGS. 18-19 illustrate further details of how MCS correction may be performed using the SINR reduction values shown in FIG. 16.

FIG. 18 is a flow chart illustrating a method 1800 of MCS correction for UL transmissions in an illustrative embodiment. The steps of method 1800 will be described with reference to access network element 700 in FIG. 7, but those skilled in the art will appreciate that method 1800 may be performed in other devices.

One assumption in this example is that scheduling mechanism 710 is scheduling a transmission from a legacy device to access network element 700 over a UL channel. Another assumption in this example is that the scheduling time is during an adjustment period 1434 of an MTC-Off interval 1412, such as shown in FIG. 16. For a sub-period 1601-1605 of the adjustment period 1434, scheduling mechanism 710 identifies the SINR reduction value for the sub-period (step 1802). A predefined special value or threshold value of y is defined (e.g., by a network operator) for an SINR reduction value to indicate that legacy devices are not allowed to use MTC radio resources, such as immediately preceding the end 1422 of an MTC-Off interval 1412. Scheduling mechanism 710 determines whether the SINR reduction value for the sub-period equals the special value of y (step 1804). If the SINR reduction value equals the special value of y, then scheduling mechanism 710 marks the MTC radio resources as unavailable for legacy transmissions/devices (step 1806). If the SINR reduction value for the sub-period does not equal the special value of y, then scheduling mechanism 710 allocates a set of radio resources (i.e., a number of radio resources) to the legacy device (step 1808). Some or all of the available radio resources allocated to the legacy device may be MTC radio resources. Thus, scheduling mechanism 710 determines whether MTC radio resources have been allocated to the legacy device (step 1810). If so, scheduling mechanism 710 subtracts the SINR reduction value for the sub-period from the estimated SINR for the legacy device to determine an adjusted SINR for the legacy device (step 1812). Scheduling mechanism 710 may then select an MCS (i.e., an adjusted MCS) for the legacy device based on the adjusted SINR (step 1814). If MTC radio resources have not been allocated to the legacy device, then scheduling mechanism 710 selects an MCS (i.e., a standard MCS) for the legacy device based on channel quality information (step 1814). When MTC radio resources are allocated to the legacy device in step 1808, scheduling mechanism 710 will schedule a UL legacy transmission by the legacy device using the adjusted (i.e., lower) MCS. Thus, a HARQ process for this UL legacy transmission is more likely to complete before the end of the MTC-Off interval 1412.

FIG. 19 is a flow chart illustrating a method 1900 of MCS correction for DL transmissions in an illustrative embodiment. The steps of method 1900 will be described with reference to access network element 700 in FIG. 7, but those skilled in the art will appreciate that method 1900 may be performed in other devices.

One assumption in this example is that scheduling mechanism 710 is scheduling transmissions from access network element 700 to legacy devices over one or more DL channels. Another assumption in this example is that the scheduling time is during an adjustment period 1434 of an MTC-Off interval 1412, such as shown in FIG. 16. For a sub-period 1601-1605 of the adjustment period 1434, scheduling mechanism 710 marks the MTC radio resources as unavailable for legacy transmissions/devices (step 1902). Scheduling mechanism 710 allocates sets of legacy radio resources (i.e., a number of radio resources or $N_{PRB}$) to legacy devices (step 1904). Because the MTC radio resources are indicated as unavailable, all of the available radio resources allocated to the legacy devices at this point are non-MTC or legacy radio resources. Scheduling mechanism 710 selects a standard MCS for each of the legacy devices based on channel quality information (e.g., the CQI reported by the legacy devices), and determines a TBS for each of the legacy devices based on the standard MCS (step 1906). As described above, scheduling mechanism 710 may determine a TBS for a device based on the MCS index and $N_{PRB}$. To determine TBS, scheduling mechanism 710 may use a lookup table to determine a TBS index based on the MCS index, such as shown in Tables 7.1.7.1-1 and 7.1.7.1-1A in 3GPP TS 36.213. Scheduling mechanism 710 may then use a lookup table to determine a TBS based on the TBS index and $N_{PRB}$, such as shown in Table 7.1.7.2.1-1.

Scheduling mechanism 710 identifies the SINR reduction value for the sub-period (step 1908). As before, a special value of y is defined for an SINR reduction value to indicate that legacy devices are not allowed to use MTC radio resources, such as immediately preceding the end 1422 of an MTC-Off interval 1412. Scheduling mechanism 710 determines whether the SINR reduction value for the sub-period equals the special value of y (step 1910). If the SINR reduction value equals the special value of y, then method 1900 ends. If the SINR reduction value for the sub-period does not equal the special value of y, then scheduling mechanism 710 selects a legacy device for MCS correction (step 1912). Scheduling mechanism 710 subtracts the SINR reduction value defined for the sub-period from the estimated SINR for the legacy device to determine an adjusted SINR for the legacy device (step 1914). Scheduling mechanism 710 then selects an adjusted MCS for the legacy device based on the adjusted SINR, and determines an adjusted TBS based on the adjusted MCS (step 1916). Scheduling mechanism 710 determines if the adjusted TBS has increased over the TBS previously determined for the legacy device (step 1918). If TBS has increased, then method 1900 ends. If TBS has not increased, then scheduling mechanism 710 allocates a set of additional MTC radio resources, which were previously marked as unavailable, to the legacy device (step 1920). For example, if the legacy device was initially allocated four legacy PRBs, scheduling mechanism 710 may allocate an additional two MTC PRBs to the legacy device. Processing then returns to step 1916 where scheduling mechanism 710 recalculates TBS for the legacy device with the additional MTC radio resources. This process of adding additional MTC radio resources and re-calculating TBS continues until TBS has increased for the legacy device.

Scheduling mechanism 710 ensures that TBS increases for a legacy device even though MCS has been lowered with MCS correction (step 1918). If MCS is lowered, it is typically the case that TBS will lower, which reduces throughput for the DL legacy transmission. But, when additional MTC radio resources are allocated to the legacy device (step 1920), TBS can be increased for the legacy device even though MCS has been lowered so that throughput is not reduced with the lower MCS. This advantageously allows scheduling mechanism 710 to schedule the DL legacy transmission for the legacy device using the adjusted (i.e., lower) MCS without reducing throughput. Thus, a HARQ process for this DL legacy transmission is more likely to complete before the end 1422 of the MTC-Off interval 1412.

Any of the various elements or modules shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor (i.e., a computer-readable medium). Some examples of the storage devices are digital or solid-state memories, magnetic storage media such as a magnetic disks and magnetic tapes, hard drives, or optically readable digital data storage media.

Although specific embodiments were described herein, the scope of the disclosure is not limited to those specific embodiments. The scope of the disclosure is defined by the following claims and any equivalents thereof.

What is claimed is:

1. An access network element of an access network, the access network element comprising at least one processor; and, at least one memory including computer program code; the at least one memory and the computer program code configured to, with the at least one processor, cause the access network element to:
   communicate with a plurality of devices over an air interface;
   store a sharing pattern that maps radio resources on a physical layer of the air interface between Machine-Type Communications (MTC) radio resources and non-MTC radio resources;
   identify a resource sharing window having an MTC-On interval where MTC is allowed, and having an MTC-Off interval where MTC is prohibited; and,
   between a threshold time and an end of the MTC-Off interval, select an adjusted Modulation and Coding Scheme (MCS) for a legacy device of the plurality of devices that is lower than a standard MCS for the legacy device selected based on channel quality information for the legacy device, to allocate a set of the MTC radio resources to the legacy device based on the sharing pattern, and to schedule a non-MTC transmission for the legacy device on the set of the MTC radio resources based on the adjusted MCS.

2. The access network element of claim 1 wherein the at least one memory and the computer program code are configured to, with the at least one processor, cause the access network element to select among multiple adjusted MCSs for the legacy device that are lower than the standard MCS, and wherein the adjusted MCSs decrease from the threshold time to the end of the MTC-Off interval.

3. The access network element of claim 2 wherein:
   a time period from the threshold time to the end of the MTC-Off interval comprises an adjustment period;
   the adjustment period comprises a plurality of sub-periods in sequence that each specify a signal-to-interference-plus-noise ratio (SINR) reduction value; and
   SINR reduction values increase from a first one of the sub-periods in the sequence to a last one of the sub-periods in the sequence.

4. The access network element of claim 3 wherein the at least one memory and the computer program code are configured to, with the at least one processor, cause the access network element to identify the SINR reduction value for a sub-period of the plurality of sub-periods, determine an estimated SINR for the legacy device based on the channel quality information, subtract the SINR reduction value for the sub-period from the estimated SINR to determine an adjusted SINR for the legacy device, and select the adjusted MCS for the legacy device based on the adjusted SINR.

5. The access network element of claim 4 wherein the at least one memory and the computer program code are configured to, with the at least one processor, cause the access network element to determine whether the SINR reduction value for the sub-period equals a threshold value, and determine that the MTC radio resources are not available to the legacy device when the SINR reduction value equals the threshold value.

6. The access network element of claim 4 wherein the at least one memory and the computer program code are configured to, with the at least one processor, cause the access network element to schedule the non-MTC transmission for the legacy device on the set of the MTC radio resources of an uplink channel.

7. The access network element of claim 4 wherein the at least one memory and the computer program code are configured to, with the at least one processor, cause the access network element to schedule the non-MTC transmission for the legacy device on the set of the MTC radio resources of a downlink channel.

8. The access network element of claim 7 wherein the at least one memory and the computer program code are configured to, with the at least one processor, cause the access network element to, between the threshold time and the end of the MTC-Off interval:
   before selecting the adjusted MCS for the legacy device, mark the MTC radio resources as unavailable, allocate a set of the non-MTC radio resources to the legacy device, select the standard MCS for the legacy device, and determine a transport block size for the legacy device based on the standard MCS;
   after selecting the adjusted MCS for the legacy device, determine an adjusted transport block size for the legacy device according to the adjusted MCS, and determine whether the adjusted transport block size is increased over the transport block size determined according to the standard MCS; and,
   when the adjusted transport block size is not increased, allocate the set of the MTC radio resources to the legacy device that were previously marked as unavailable until the adjusted transport block size is increased.

9. The access network element of claim 1 wherein the at least one memory and the computer program code are configured to, with the at least one processor, cause the access network element to request a legacy load and an MTC load in the access network, determine whether the legacy load exceeds a first high threshold, and set a duration of the MTC-On interval for a next resource sharing window to a minimum when the legacy load exceeds the first high threshold;
- when the legacy load does not exceed the first high threshold, determine whether the legacy load is less than a first low threshold, and set the duration of the MTC-On interval for the next resource sharing window to a maximum when the legacy load is less than the first low threshold;
- when the legacy load is not less than the first low threshold, determine whether the MTC load exceeds a second high threshold, and increase the duration of the MTC-On interval for the next resource sharing window when the MTC load exceeds the second high threshold;
- when the MTC load does not exceed the second high threshold, determine whether the MTC load is less than a second low threshold, and decrease the duration of the MTC-On interval for the next resource sharing window when the MTC load is less than the second low threshold; and,
- when the MTC load is not less than the second low threshold, maintain the duration of the MTC-On interval in the next resource sharing window.

10. A method of sharing an air interface between an access network element of an access network and a plurality of devices, the method comprising:
- storing a sharing pattern that maps radio resources on a physical layer of the air interface between Machine-Type Communications (MTC) radio resources and non-MTC radio resources;
- identifying a resource sharing window having an MTC-On interval where MTC is allowed, and having an MTC-Off interval where MTC is prohibited;
- between a threshold time and an end of the MTC-Off interval, the method comprises:
  - selecting an adjusted Modulation and Coding Scheme (MCS) for a legacy device of the plurality of devices that is lower than a standard MCS for the legacy device selected based on channel quality information for the legacy device;
  - allocating a set of the MTC radio resources to the legacy device based on the sharing pattern; and
  - scheduling a non-MTC transmission for the legacy device on the set of the MTC radio resources based on the adjusted MCS.

11. The method of claim 10 wherein:
- selecting the adjusted MCS for the legacy device comprises selecting among multiple adjusted MCSs for the legacy device that are lower than the standard MCS; and
- the adjusted MCSs decrease from the threshold time to the end of the MTC-Off interval.

12. The method of claim 11 wherein:
- a time period from the threshold time to the end of the MTC-Off interval comprises an adjustment period;
- the adjustment period comprises a plurality of sub-periods in sequence that each specify a signal-to-interference-plus-noise ratio (SINR) reduction value; and
- SINR reduction values increase from a first one of the sub-periods in the sequence to a last one of the sub-periods in the sequence.

13. The method of claim 12 wherein selecting the adjusted MCS comprises:
- identifying the SINR reduction value for a sub-period of the plurality of sub-periods;
- determining an estimated SINR for the legacy device based on the channel quality information;
- subtracting the SINR reduction value for the sub-period from the estimated SINR to determine an adjusted SINR for the legacy device; and
- selecting the adjusted MCS for the legacy device based on the adjusted SINR.

14. The method of claim 13 further comprising:
- determining whether the SINR reduction value for the sub-period equals a threshold value; and
- determining that the MTC radio resources are not available to the legacy device when the SINR reduction value equals the threshold value.

15. The method of claim 13 wherein:
- scheduling the non-MTC transmission for the legacy device comprises scheduling the non-MTC transmission for the legacy device on the set of the MTC radio resources of an uplink channel.

16. The method of claim 13 wherein:
- scheduling the non-MTC transmission for the legacy device comprises scheduling the non-MTC transmission for the legacy device on the set of the MTC radio resources of a downlink channel.

17. The method of claim 16 wherein between the threshold time and the end of the MTC-Off interval:
- before selecting the adjusted MCS for the legacy device, the method comprises:
  - marking the MTC radio resources as unavailable;
  - allocating a set of the non-MTC radio resources to the legacy device;
  - selecting the standard MCS for the legacy device; and
  - determining a transport block size for the legacy device based on the standard MCS;
- after selecting the adjusted MCS for the legacy device, the method comprises:
  - determining an adjusted transport block size for the legacy device according to the adjusted MCS;
  - determining whether the adjusted transport block size is increased over the transport block size determined according to the standard MCS; and
  - when the adjusted transport block size is not increased, allocating the set of the MTC radio resources to the legacy device that were previously marked as unavailable until the adjusted transport block size is increased.

18. The method of claim 10 further comprising:
- requesting a legacy load and an MTC load in the access network, determining whether the legacy load exceeds a first high threshold, and setting a duration of the MTC-On interval for a next resource sharing window to a minimum when the legacy load exceeds the first high threshold;
- when the legacy load does not exceed the first high threshold, the method further comprises determining whether the legacy load is less than a first low threshold, and setting the duration of the MTC-On interval for the next resource sharing window to a maximum when the legacy load is less than the first low threshold;
- when the legacy load is not less than the first low threshold, the method further comprises determining whether the MTC load exceeds a second high threshold, and increasing the duration of the MTC-On interval for the next resource sharing window when the MTC load exceeds the second high threshold;

when the MTC load does not exceed the second high threshold, the method further comprises determining whether the MTC load is less than a second low threshold, and decreasing the duration of the MTC-On interval for the next resource sharing window when the MTC load is less than the second low threshold;

when the MTC load is not less than the second low threshold, the method further comprises maintaining the duration of the MTC-On interval in the next resource sharing window.

19. A non-transitory computer readable medium embodying programmed instructions executed by a processor, wherein the instructions direct the processor to implement:
an access network element of an access network configured to communicate with a plurality of devices over an air interface;
the access network element is configured to store a sharing pattern that maps radio resources on a physical layer of the air interface between Machine-Type Communications (MTC) radio resources and non-MTC radio resources; and
the access network element is configured to identify a resource sharing window having an MTC-On interval where MTC is allowed, and having an MTC-Off interval where MTC is prohibited;
between a threshold time and an end of the MTC-Off interval, the access network element is operable to select an adjusted Modulation and Coding Scheme (MCS) for a legacy device of the plurality of devices that is lower than a standard MCS for the legacy device selected based on channel quality information for the legacy device, to allocate a set of the MTC radio resources to the legacy device based on the sharing pattern, and to schedule a non-MTC transmission for the legacy device on the set of the MTC radio resources based on the adjusted MCS.

20. The non-transitory computer readable medium of claim 19 wherein:
a time period from the threshold time to the end of the MTC-Off interval comprises an adjustment period;
the adjustment period comprises a plurality of sub-periods in sequence that each specify a signal-to-interference-plus-noise ratio (SINR) reduction value;

SINR reduction values increase from a first one of the sub-periods in the sequence to a last one of the sub-periods in the sequence; and
the access network element is configured to identify the SINR reduction value for a sub-period of the plurality of sub-periods, to determine an estimated SINR for the legacy device based on the channel quality information, to subtract the SINR reduction value for the sub-period from the estimated SINR to determine an adjusted SINR for the legacy device, and to select the adjusted MCS for the legacy device based on the adjusted SINR.

21. The access network element of claim 1 comprising:
at least one of a base station, a wireless access point, and a base station and associated controller.

22. A system comprising:
a plurality of devices; and,
an access network element comprising at least one processor; and, at least one memory including computer program code; the at least one memory and the computer program code configured to, with the at least one processor, cause the access network element to:
communicate with the plurality of devices over an air interface,
store a sharing pattern that maps radio resources on a physical layer of the air interface between Machine-Type Communications (MTC) radio resources and non-MTC radio resources,
identify a resource sharing window having an MTC-On interval where MTC is allowed, and having an MTC-Off interval where MTC is prohibited, and,
between a threshold time and an end of the MTC-Off interval, select an adjusted Modulation and Coding Scheme (MCS) for a legacy device of the plurality of devices that is lower than a standard MCS for the legacy device selected based on channel quality information for the legacy device, allocate a set of the MTC radio resources to the legacy device based on the sharing pattern, and schedule a non-MTC transmission for the legacy device on the set of the MTC radio resources based on the adjusted MCS.

\* \* \* \* \*